United States Patent
Sakamoto et al.

(10) Patent No.: US 9,090,718 B2
(45) Date of Patent: Jul. 28, 2015

(54) WATER-ABSORBING RESIN AND METHOD FOR MANUFACTURING THE SAME

(75) Inventors: Shigeru Sakamoto, Himeji (JP); Hiroyuki Ikeuchi, Himeji (JP); Sayaka Machida, Himeji (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 446 days.

(21) Appl. No.: 11/723,822

(22) Filed: Mar. 22, 2007

(65) Prior Publication Data

US 2007/0225422 A1 Sep. 27, 2007

(30) Foreign Application Priority Data

Mar. 24, 2006 (JP) ................................. 2006-083909

(51) Int. Cl.
*C08F 2/44* (2006.01)
*C08F 220/06* (2006.01)
*C08F 222/10* (2006.01)

(52) U.S. Cl.
CPC ................. *C08F 2/44* (2013.01); *C08F 220/06* (2013.01); *C08F 222/1006* (2013.01)

(58) Field of Classification Search
CPC .................................. C08F 2/44; C08F 220/06
USPC .................................. 524/457, 458, 460, 461
See application file for complete search history.

(56) References Cited

U.S. PATENT DOCUMENTS

| | | | |
|---|---|---|---|
| 625,488 A | 5/1899 | Auspitz |
| 632,352 A | 9/1899 | Jones |
| 670,141 A | 3/1901 | Shepard |
| 922,717 A | 5/1909 | Parker |
| 955,086 A | 4/1910 | Laux |
| 3,259,374 A | 7/1966 | Doebl et al. |
| 3,346,242 A | 10/1967 | List |
| 3,935,099 A | 1/1976 | Weaver et al. |
| 3,959,569 A | 5/1976 | Burkholder, Jr. |
| 4,043,952 A | 8/1977 | Ganslaw et al. |
| 4,076,663 A | 2/1978 | Masuda et al. |
| 4,090,013 A | 5/1978 | Ganslaw et al. |
| 4,093,776 A | 6/1978 | Aoki et al. |
| 4,124,748 A | 11/1978 | Fujimoto et al. |
| 4,190,563 A | 2/1980 | Bosley et al. |
| 4,224,427 A | 9/1980 | Mueller et al. |
| 4,286,082 A | 8/1981 | Tsubakimoto et al. |
| 4,320,040 A | 3/1982 | Fujita et al. |
| 4,351,922 A | 9/1982 | Yoshida et al. |
| 4,367,323 A | 1/1983 | Kitamura et al. |
| 4,389,513 A | 6/1983 | Miyazaki |
| 4,416,711 A | 11/1983 | Jessop et al. |
| 4,446,261 A | 5/1984 | Yamasaki et al. |
| 4,455,284 A | 6/1984 | Sizyakov et al. |
| 4,497,930 A | 2/1985 | Yamasaki et al. |
| 4,526,937 A | 7/1985 | Hsu |
| 4,558,091 A | 12/1985 | Hubbard |
| 4,587,308 A | 5/1986 | Makita et al. |
| 4,625,001 A | 11/1986 | Tsubakimoto et al. |
| 4,652,001 A | 3/1987 | Rathbun et al. |
| 4,654,039 A | 3/1987 | Brandt et al. |
| 4,666,983 A | 5/1987 | Tsubakimoto et al. |
| 4,683,274 A | 7/1987 | Nakamura et al. |
| 4,690,996 A | 9/1987 | Shih et al. |
| 4,693,713 A | 9/1987 | Chmelir et al. |
| 4,721,647 A | 1/1988 | Nakanishi et al. |
| 4,734,478 A | 3/1988 | Tsubakimoto et al. |
| RE32,649 E | 4/1988 | Brandt et al. |
| 4,738,867 A | 4/1988 | Itoh et al. |
| 4,748,076 A | 5/1988 | Saotome |
| 4,755,562 A | 7/1988 | Alexander et al. |
| 4,769,427 A | 9/1988 | Nowakowsky et al. |
| 4,771,105 A | 9/1988 | Shirai et al. |
| 4,783,510 A | 11/1988 | Saotome |
| 4,824,901 A | 4/1989 | Alexander et al. |
| 4,826,917 A | 5/1989 | Kondo et al. |
| 4,863,989 A | 9/1989 | Obayashi et al. |
| 4,873,299 A | 10/1989 | Nowakowsky et al. |
| 4,880,455 A | 11/1989 | Blank |
| 4,948,818 A | 8/1990 | Carmody et al. |

(Continued)

FOREIGN PATENT DOCUMENTS

| | | |
|---|---|---|
| CA | 2 433 044 A1 | 7/2002 |
| CA | 2 403 966 A1 | 9/2002 |

(Continued)

OTHER PUBLICATIONS

Full translation of JP 01126314A to Nagasuna et al.*
European Search Report for corresponding European Application No. 07005807.8 dated Aug. 1, 2007.
European Search Report for corresponding European Application No. 07005807.8 dated Jun. 11, 2007.
Japanese Office Action mailed Jul. 10, 2012 in corresponding Application No. 2007-080101, with English translation.
Japanese Office Action mailed Apr. 23, 2013, issued in Application No. 2007-080101, with English translation.

(Continued)

*Primary Examiner* — Karuna P Reddy
(74) *Attorney, Agent, or Firm* — Harness, Dickey & Pierce, P.L.C.

(57) ABSTRACT

The present invention provides a highly productive method for manufacturing a water-absorbing resin, the amounts of fine powder and dust of which are small, the amount of residual monomer of which is small, and whose absorption rate is high. That is, the method for manufacturing the water-absorbing resin of the present invention is a method for crosslinking and polymerizing an aqueous solution of an acid-group containing unsaturated monomer, and is characterized in that stationary polymerization is carried out in such a manner that a solid matter is added to the monomer aqueous solution, and an initiation temperature of the polymerization is adjusted to 40° C. or more or a maximum temperature of the polymerization is adjusted to 100° C. or more.

9 Claims, 1 Drawing Sheet

(56) References Cited

U.S. PATENT DOCUMENTS

| | | | |
|---|---|---|---|
| 4,950,692 | A | 8/1990 | Lewis et al. |
| 4,972,019 | A | 11/1990 | Obayashi et al. |
| 4,973,632 | A | 11/1990 | Nagasuna et al. |
| 4,985,514 | A | 1/1991 | Kimura et al. |
| 4,985,518 | A | 1/1991 | Alexander et al. |
| 5,002,986 | A | 3/1991 | Fujiura et al. |
| 5,026,800 | A | 6/1991 | Kimura et al. |
| 5,030,205 | A | 7/1991 | Holdaway et al. |
| 5,051,259 | A | 9/1991 | Olsen et al. |
| 5,061,259 | A | 10/1991 | Goldman et al. |
| RE33,839 | E | 3/1992 | Chmelir et al. |
| 5,124,416 | A | 6/1992 | Haruna et al. |
| 5,140,076 | A | 8/1992 | Hatsuda et al. |
| 5,145,906 | A | 9/1992 | Chambers et al. |
| 5,147,343 | A | 9/1992 | Kellenberger |
| 5,149,335 | A | 9/1992 | Kellenberger et al. |
| 5,154,713 | A | 10/1992 | Lind |
| 5,164,459 | A | 11/1992 | Kimura et al. |
| 5,180,798 | A | 1/1993 | Nakamura et al. |
| 5,185,413 | A | 2/1993 | Yoshinaga et al. |
| 5,229,488 | A | 7/1993 | Nagasuna et al. |
| 5,244,735 | A | 9/1993 | Kimura et al. |
| 5,250,640 | A | 10/1993 | Irie et al. |
| 5,264,495 | A * | 11/1993 | Irie et al. .................. 525/301 |
| 5,275,773 | A | 1/1994 | Irie et al. |
| 5,288,814 | A | 2/1994 | Long, II et al. |
| 5,296,650 | A | 3/1994 | Kobayashi et al. |
| 5,300,192 | A | 4/1994 | Hansen et al. |
| 5,308,896 | A | 5/1994 | Hansen et al. |
| 5,314,420 | A | 5/1994 | Smith et al. |
| 5,322,896 | A | 6/1994 | Ueda et al. |
| 5,328,935 | A | 7/1994 | Van Phan et al. |
| 5,338,766 | A | 8/1994 | Phan et al. |
| 5,369,148 | A | 11/1994 | Takahashi et al. |
| 5,371,148 | A | 12/1994 | Taylor et al. |
| 5,380,808 | A | 1/1995 | Sumiya et al. |
| 5,385,983 | A | 1/1995 | Graham |
| 5,409,771 | A | 4/1995 | Dahmen et al. |
| 5,419,956 | A | 5/1995 | Roe |
| 5,422,405 | A | 6/1995 | Dairoku et al. |
| 5,439,993 | A | 8/1995 | Ito et al. |
| 5,447,727 | A | 9/1995 | Graham |
| 5,447,977 | A | 9/1995 | Hansen et al. |
| 5,453,323 | A | 9/1995 | Chambers et al. |
| 5,455,284 | A | 10/1995 | Dahmen et al. |
| 5,462,972 | A | 10/1995 | Smith et al. |
| 5,475,062 | A | 12/1995 | Ishizaki et al. |
| 5,478,879 | A | 12/1995 | Kajikawa et al. |
| 5,506,324 | A | 4/1996 | Gartner et al. |
| 5,532,323 | A | 7/1996 | Yano et al. |
| 5,538,783 | A | 7/1996 | Hansen et al. |
| 5,543,215 | A | 8/1996 | Hansen et al. |
| 5,543,433 | A | 8/1996 | Doetzer et al. |
| 5,562,646 | A | 10/1996 | Goldman et al. |
| 5,571,618 | A | 11/1996 | Hansen et al. |
| 5,574,121 | A | 11/1996 | Irie et al. |
| 5,589,256 | A | 12/1996 | Hansen et al. |
| 5,597,873 | A | 1/1997 | Chambers et al. |
| 5,599,335 | A | 2/1997 | Goldman et al. |
| 5,601,452 | A | 2/1997 | Ruffa |
| 5,601,542 | A | 2/1997 | Melius et al. |
| 5,609,727 | A | 3/1997 | Hansen et al. |
| 5,610,208 | A | 3/1997 | Dairoku et al. |
| 5,610,220 | A | 3/1997 | Klimmek et al. |
| 5,614,570 | A | 3/1997 | Hansen et al. |
| 5,624,967 | A | 4/1997 | Hitomi et al. |
| 5,633,316 | A | 5/1997 | Gartner et al. |
| 5,656,087 | A | 8/1997 | Kikuchi et al. |
| 5,668,078 | A | 9/1997 | Sumiya et al. |
| 5,669,894 | A | 9/1997 | Goldman et al. |
| 5,672,633 | A | 9/1997 | Brehm et al. |
| 5,684,072 | A | 11/1997 | Rardon et al. |
| 5,712,316 | A | 1/1998 | Dahmen et al. |
| 5,728,742 | A | 3/1998 | Staples et al. |
| 5,744,564 | A | 4/1998 | Stanley, Jr. et al. |
| 5,760,080 | A | 6/1998 | Wada et al. |
| 5,795,893 | A | 8/1998 | Bondinell et al. |
| 5,797,893 | A | 8/1998 | Wada et al. |
| 5,801,238 | A | 9/1998 | Tanaka et al. |
| 5,837,789 | A | 11/1998 | Stockhausen et al. |
| 5,843,575 | A | 12/1998 | Wang et al. |
| 5,849,405 | A | 12/1998 | Wang et al. |
| 5,851,672 | A | 12/1998 | Wang et al. |
| 5,853,867 | A | 12/1998 | Harada et al. |
| 5,858,535 | A | 1/1999 | Wang et al. |
| 5,861,429 | A | 1/1999 | Sato et al. |
| 5,883,158 | A | 3/1999 | Nambu et al. |
| 5,973,042 | A | 10/1999 | Yoshinaga et al. |
| 5,981,070 | A | 11/1999 | Ishizaki et al. |
| 5,985,944 | A | 11/1999 | Ishizaki et al. |
| 5,987,070 | A | 11/1999 | Fimoff et al. |
| 5,994,440 | A | 11/1999 | Staples et al. |
| 6,037,431 | A | 3/2000 | Shioji et al. |
| 6,054,541 | A | 4/2000 | Wada et al. |
| 6,071,976 | A | 6/2000 | Dairoku et al. |
| 6,076,277 | A | 6/2000 | Eyerer et al. |
| 6,087,002 | A | 7/2000 | Kimura et al. |
| 6,087,450 | A | 7/2000 | Breitbach et al. |
| 6,099,950 | A | 8/2000 | Wang et al. |
| 6,100,305 | A | 8/2000 | Miyake et al. |
| 6,107,358 | A | 8/2000 | Harada et al. |
| 6,110,992 | A | 8/2000 | Wada et al. |
| 6,124,391 | A | 9/2000 | Sun et al. |
| 6,127,454 | A | 10/2000 | Wada et al. |
| 6,133,193 | A | 10/2000 | Kajikawa et al. |
| 6,136,973 | A | 10/2000 | Suzuki et al. |
| 6,140,395 | A | 10/2000 | Hatsuda et al. |
| 6,143,821 | A | 11/2000 | Houben |
| 6,150,582 | A | 11/2000 | Wada et al. |
| RE37,021 | E | 1/2001 | Aida |
| 6,174,929 | B1 | 1/2001 | Hähnle et al. |
| 6,174,978 | B1 | 1/2001 | Hatsuda et al. |
| 6,180,724 | B1 | 1/2001 | Wada et al. |
| 6,184,433 | B1 | 2/2001 | Harada et al. |
| 6,194,531 | B1 | 2/2001 | Hatsuda et al. |
| 6,199,992 | B1 | 3/2001 | Tanada |
| 6,207,772 | B1 | 3/2001 | Hatsuda et al. |
| 6,228,930 | B1 | 5/2001 | Dairoku et al. |
| 6,232,520 | B1 | 5/2001 | Hird et al. |
| 6,239,230 | B1 | 5/2001 | Eckert et al. |
| 6,241,928 | B1 | 6/2001 | Hatsuda et al. |
| 6,251,950 | B1 | 6/2001 | Durden et al. |
| 6,251,960 | B1 | 6/2001 | Ishizaki et al. |
| 6,254,990 | B1 | 7/2001 | Ishizaki et al. |
| 6,284,362 | B1 | 9/2001 | Takai et al. |
| 6,297,319 | B1 | 10/2001 | Nagasuna et al. |
| 6,297,335 | B1 | 10/2001 | Funk et al. |
| 6,300,275 | B1 | 10/2001 | Weir |
| 6,300,423 | B1 | 10/2001 | Engelhardt et al. |
| 6,310,156 | B1 | 10/2001 | Maeda et al. |
| 6,313,231 | B1 | 11/2001 | Hosokawa et al. |
| 6,323,252 | B1 | 11/2001 | Gartner et al. |
| 6,335,406 | B1 | 1/2002 | Nagasuna et al. |
| 6,360,077 | B2 | 3/2002 | Mizoguchi |
| 6,372,852 | B2 | 4/2002 | Hitomi et al. |
| 6,376,618 | B1 | 4/2002 | Mitchell et al. |
| 6,388,000 | B1 | 5/2002 | Irie et al. |
| 6,403,700 | B1 | 6/2002 | Dahmen et al. |
| 6,414,214 | B1 | 7/2002 | Engelhardt et al. |
| 6,417,425 | B1 | 7/2002 | Whitmore et al. |
| 6,433,058 | B1 | 8/2002 | Weir et al. |
| 6,444,744 | B1 | 9/2002 | Fujimaru et al. |
| 6,448,320 | B1 | 9/2002 | Igarashi et al. |
| 6,455,600 | B1 | 9/2002 | Hahnle et al. |
| 6,458,921 | B1 | 10/2002 | Dairoku et al. |
| 6,469,080 | B2 | 10/2002 | Miyake et al. |
| 6,472,478 | B1 | 10/2002 | Funk et al. |
| 6,514,615 | B1 | 2/2003 | Sun et al. |
| 6,559,239 | B1 | 5/2003 | Riegel et al. |
| 6,562,743 | B1 | 5/2003 | Cook et al. |
| 6,562,879 | B1 | 5/2003 | Hatsuda et al. |
| 6,565,768 | B1 | 5/2003 | Dentler et al. |
| 6,579,958 | B2 | 6/2003 | Wilson |
| 6,586,549 | B1 | 7/2003 | Hatsuda et al. |

(56) References Cited

U.S. PATENT DOCUMENTS

| | | |
|---|---|---|
| 6,599,989 B2 | 7/2003 | Wada et al. |
| 6,605,673 B1 | 8/2003 | Mertens et al. |
| 6,620,889 B1 | 9/2003 | Mertens et al. |
| 6,620,899 B1 | 9/2003 | Morken et al. |
| 6,657,015 B1 | 12/2003 | Riegel et al. |
| 6,667,372 B1 | 12/2003 | Miyake et al. |
| RE38,444 E | 2/2004 | Wada et al. |
| 6,716,894 B2 | 4/2004 | Kajikawa et al. |
| 6,716,929 B2 | 4/2004 | Wilson |
| 6,720,073 B2 | 4/2004 | Lange et al. |
| 6,727,345 B2 | 4/2004 | Kajikawa et al. |
| 6,730,387 B2 | 5/2004 | Rezai et al. |
| 6,743,391 B2 | 6/2004 | Sun et al. |
| 6,787,001 B2 | 9/2004 | Sakamoto et al. |
| 6,809,158 B2 | 10/2004 | Ikeuchi et al. |
| 6,831,142 B2 | 12/2004 | Mertens et al. |
| 6,835,325 B1 | 12/2004 | Nakamura et al. |
| 6,841,229 B2 | 1/2005 | Sun et al. |
| 6,849,665 B2 | 2/2005 | Frenz et al. |
| 6,927,268 B2 * | 8/2005 | Matsumoto et al. ....... 526/317.1 |
| 6,930,221 B1 | 8/2005 | Strandqvist |
| 6,951,895 B1 | 10/2005 | Qin et al. |
| 6,992,144 B2 | 1/2006 | Dairoku et al. |
| 7,049,366 B2 | 5/2006 | Nakahara et al. |
| 7,157,141 B2 | 1/2007 | Inger et al. |
| 7,169,843 B2 | 1/2007 | Smith et al. |
| 7,173,086 B2 | 2/2007 | Smith et al. |
| 7,179,875 B2 | 2/2007 | Fuchs et al. |
| 7,282,262 B2 | 10/2007 | Adachi et al. |
| 7,285,599 B2 | 10/2007 | Mertens et al. |
| 7,307,132 B2 | 12/2007 | Nestler et al. |
| 7,378,453 B2 | 5/2008 | Nogi et al. |
| 7,435,477 B2 | 10/2008 | Adachi et al. |
| 7,473,739 B2 | 1/2009 | Dairoku et al. |
| 7,510,988 B2 | 3/2009 | Wada et al. |
| 7,557,245 B2 | 7/2009 | Nordhoff et al. |
| 7,572,864 B2 | 8/2009 | Mertens et al. |
| 7,582,705 B2 | 9/2009 | Dairoku et al. |
| 7,745,537 B2 | 6/2010 | Nakashima et al. |
| 7,750,085 B2 | 7/2010 | Torii et al. |
| 7,803,880 B2 | 9/2010 | Torii et al. |
| 7,816,445 B2 | 10/2010 | Dairoku et al. |
| 7,851,550 B2 | 12/2010 | Kadonaga et al. |
| 7,879,923 B2 | 2/2011 | Matsumoto et al. |
| 7,960,469 B2 | 6/2011 | Adachi et al. |
| 8,198,209 B2 | 6/2012 | Torii et al. |
| 8,309,654 B2 | 11/2012 | Miyake et al. |
| 8,430,960 B2 | 4/2013 | Sumakeris et al. |
| 8,481,664 B2 * | 7/2013 | Dairoku et al. ............ 526/317.1 |
| 8,497,226 B2 | 7/2013 | Torii et al. |
| 8,552,134 B2 | 10/2013 | Fujimaru et al. |
| 8,596,931 B2 | 12/2013 | Nagashima et al. |
| 2001/0025093 A1 * | 9/2001 | Ishizaki et al. ................. 526/210 |
| 2001/0046867 A1 | 11/2001 | Mizoguchi |
| 2001/0053807 A1 | 12/2001 | Miyake et al. |
| 2001/0053826 A1 | 12/2001 | Hosokawa et al. |
| 2002/0013394 A1 | 1/2002 | Dairoku et al. |
| 2002/0040095 A1 | 4/2002 | Dairoku et al. |
| 2002/0072471 A1 | 6/2002 | Ikeuchi et al. |
| 2002/0120074 A1 | 8/2002 | Wada et al. |
| 2002/0120085 A1 | 8/2002 | Matsumoto et al. |
| 2002/0127166 A1 | 9/2002 | Bergeron et al. |
| 2002/0128618 A1 | 9/2002 | Frenz et al. |
| 2002/0161132 A1 | 10/2002 | Irie et al. |
| 2002/0165288 A1 | 11/2002 | Frenz et al. |
| 2002/0169252 A1 | 11/2002 | Wilson |
| 2002/0193492 A1 | 12/2002 | Wilson |
| 2003/0020199 A1 | 1/2003 | Kajikawa et al. |
| 2003/0060112 A1 | 3/2003 | Rezai et al. |
| 2003/0065215 A1 | 4/2003 | Sakamoto et al. |
| 2003/0069359 A1 | 4/2003 | Torii et al. |
| 2003/0092849 A1 | 5/2003 | Dairoku et al. |
| 2003/0100830 A1 | 5/2003 | Zhong et al. |
| 2003/0118820 A1 | 6/2003 | Sun et al. |
| 2003/0118821 A1 | 6/2003 | Sun et al. |
| 2003/0153887 A1 | 8/2003 | Nawata et al. |
| 2003/0207997 A1 | 11/2003 | Mertens et al. |
| 2004/0018365 A1 | 1/2004 | Krautkramer et al. |
| 2004/0019342 A1 | 1/2004 | Nagasuna et al. |
| 2004/0024104 A1 | 2/2004 | Ota et al. |
| 2004/0042952 A1 | 3/2004 | Bergeron et al. |
| 2004/0050679 A1 | 3/2004 | Hammon et al. |
| 2004/0071966 A1 | 4/2004 | Inger et al. |
| 2004/0106745 A1 | 6/2004 | Nakashima et al. |
| 2004/0110006 A1 | 6/2004 | Ishizaki et al. |
| 2004/0110897 A1 | 6/2004 | Sakamoto et al. |
| 2004/0110913 A1 | 6/2004 | Kanto et al. |
| 2004/0110914 A1 | 6/2004 | Nakahara et al. |
| 2004/0157734 A1 | 8/2004 | Mertens et al. |
| 2004/0176544 A1 | 9/2004 | Mertens et al. |
| 2004/0180189 A1 | 9/2004 | Funk et al. |
| 2004/0181031 A1 | 9/2004 | Nogi et al. |
| 2004/0213892 A1 | 10/2004 | Jonas et al. |
| 2004/0236049 A1 | 11/2004 | Fuchs et al. |
| 2004/0242761 A1 | 12/2004 | Dairoku et al. |
| 2005/0000671 A1 | 1/2005 | Ishii et al. |
| 2005/0013865 A1 | 1/2005 | Nestler et al. |
| 2005/0020780 A1 | 1/2005 | Inger et al. |
| 2005/0048221 A1 | 3/2005 | Irie et al. |
| 2005/0049379 A1 | 3/2005 | Adachi et al. |
| 2005/0070071 A1 | 3/2005 | Henley et al. |
| 2005/0070671 A1 | 3/2005 | Torii et al. |
| 2005/0080194 A1 | 4/2005 | Satake et al. |
| 2005/0101680 A1 | 5/2005 | Sun et al. |
| 2005/0113542 A1 | 5/2005 | Irie et al. |
| 2005/0118423 A1 | 6/2005 | Adachi et al. |
| 2005/0154146 A1 | 7/2005 | Burgert |
| 2005/0176910 A1 | 8/2005 | Jaworek et al. |
| 2005/0209352 A1 | 9/2005 | Dairoku et al. |
| 2005/0209411 A1 | 9/2005 | Nestler et al. |
| 2005/0215734 A1 | 9/2005 | Dairoku et al. |
| 2005/0215752 A1 | 9/2005 | Popp et al. |
| 2005/0221980 A1 | 10/2005 | Adachi et al. |
| 2005/0222459 A1 | 10/2005 | Nordhoff et al. |
| 2005/0222547 A1 | 10/2005 | Beruda et al. |
| 2005/0234413 A1 | 10/2005 | Funk et al. |
| 2005/0256469 A1 | 11/2005 | Qin et al. |
| 2005/0272600 A1 | 12/2005 | Wada et al. |
| 2005/0288182 A1 | 12/2005 | Torii et al. |
| 2006/0020078 A1 | 1/2006 | Popp et al. |
| 2006/0025536 A1 | 2/2006 | Dairoku et al. |
| 2006/0036043 A1 | 2/2006 | Nestler et al. |
| 2006/0073969 A1 | 4/2006 | Torii et al. |
| 2006/0074160 A1 | 4/2006 | Handa et al. |
| 2006/0079630 A1 | 4/2006 | Himori et al. |
| 2006/0089512 A1 | 4/2006 | Bennett et al. |
| 2006/0204755 A1 | 9/2006 | Torii et al. |
| 2006/0229413 A1 | 10/2006 | Torii et al. |
| 2007/0078231 A1 | 4/2007 | Shibata et al. |
| 2007/0101939 A1 | 5/2007 | Sumakeris et al. |
| 2007/0106013 A1 | 5/2007 | Adachi et al. |
| 2007/0149691 A1 | 6/2007 | Ishizaki et al. |
| 2007/0149716 A1 | 6/2007 | Funk et al. |
| 2007/0203280 A1 | 8/2007 | Okochi |
| 2007/0207924 A1 | 9/2007 | Ikeuchi et al. |
| 2007/0225422 A1 | 9/2007 | Sakamoto et al. |
| 2007/0239124 A1 | 10/2007 | Handa et al. |
| 2007/0254177 A1 | 11/2007 | Smith et al. |
| 2008/0021131 A1 | 1/2008 | Mertens et al. |
| 2008/0032888 A1 | 2/2008 | Nakamura et al. |
| 2008/0119586 A1 | 5/2008 | Byerly et al. |
| 2008/0119626 A1 | 5/2008 | Fujimaru et al. |
| 2008/0125533 A1 | 5/2008 | Riegel et al. |
| 2008/0139693 A1 | 6/2008 | Ikeuchi et al. |
| 2008/0161512 A1 | 7/2008 | Kawano et al. |
| 2008/0166410 A1 | 7/2008 | Funk et al. |
| 2009/0036855 A1 | 2/2009 | Wada et al. |
| 2009/0186542 A1 | 7/2009 | Kondo et al. |
| 2009/0234314 A1 | 9/2009 | Nakamura et al. |
| 2009/0239966 A1 | 9/2009 | Matsumoto et al. |
| 2010/0119312 A1 | 5/2010 | Nagashima et al. |
| 2010/0160883 A1 | 6/2010 | Jonas et al. |
| 2011/0301560 A1 | 12/2011 | Fujimura et al. |

(56) References Cited

U.S. PATENT DOCUMENTS

| | | | |
|---|---|---|---|
| 2012/0184670 A1 | 7/2012 | Kobayashi et al. | |
| 2012/0298913 A1 | 11/2012 | Kondo et al. | |
| 2014/0054497 A1 * | 2/2014 | Wattebled et al. | 252/194 |

FOREIGN PATENT DOCUMENTS

| | | | |
|---|---|---|---|
| CA | 2 426 514 A1 | 3/2003 | |
| CA | 2 426 802 A1 | 4/2003 | |
| CN | 1181272 A | 5/1998 | |
| CN | 1204665 A | 1/1999 | |
| CN | 1344756 A | 4/2002 | |
| CN | 1443092 | 9/2003 | |
| CN | 1610707 A | 4/2005 | |
| DE | 10221202 A1 | 7/2003 | |
| EP | 0 001 706 A1 | 5/1979 | |
| EP | 0 205 674 A1 | 12/1986 | |
| EP | 0 304 319 A2 | 2/1989 | |
| EP | 0 339 461 A1 | 11/1989 | |
| EP | 0 349 240 A2 | 1/1990 | |
| EP | 0 450 923 A2 | 10/1991 | |
| EP | 0 454 497 A2 * | 10/1991 | |
| EP | 0 456 136 A2 | 11/1991 | |
| EP | 0 461 613 A1 | 12/1991 | |
| EP | 0 481 443 A1 | 4/1992 | |
| EP | 0 493 011 A2 | 7/1992 | |
| EP | 0 521 355 A1 | 1/1993 | |
| EP | 0 530 517 A1 | 3/1993 | |
| EP | 0 532 002 A1 | 3/1993 | |
| EP | 0 603 292 A1 | 6/1994 | |
| EP | 0 605 150 A1 | 7/1994 | |
| EP | 0 605 215 A1 | 7/1994 | |
| EP | 0 621 041 A1 | 10/1994 | |
| EP | 0 627 411 A1 | 12/1994 | |
| EP | 0 629 411 A1 | 12/1994 | |
| EP | 0 629 441 A1 | 12/1994 | |
| EP | 0 668 080 A2 | 8/1995 | |
| EP | 0 695 763 A1 | 2/1996 | |
| EP | 0 707 603 A1 | 4/1996 | |
| EP | 0 712 659 A1 | 5/1996 | |
| EP | 0 761 241 A2 | 3/1997 | |
| EP | 0 811 636 | 12/1997 | |
| EP | 0 812 873 A1 | 12/1997 | |
| EP | 0 837 076 A2 | 4/1998 | |
| EP | 0 844 270 A1 | 5/1998 | |
| EP | 0 889 063 A1 | 1/1999 | |
| EP | 0 922 717 A1 | 6/1999 | |
| EP | 0 937 739 A2 | 8/1999 | |
| EP | 0 940 148 A1 | 9/1999 | |
| EP | 0 942 014 A2 | 9/1999 | |
| EP | 0 955 086 A2 | 11/1999 | |
| EP | 1 029 886 A2 | 8/2000 | |
| EP | 1 072 630 A1 | 1/2001 | |
| EP | 1 113 037 A2 | 7/2001 | |
| EP | 1 130 045 A2 | 9/2001 | |
| EP | 1 153 656 A2 | 11/2001 | |
| EP | 1 169 379 A1 | 1/2002 | |
| EP | 1 178 059 A2 | 2/2002 | |
| EP | 1 275 669 A1 | 1/2003 | |
| EP | 1 302 485 A1 | 4/2003 | |
| EP | 1 315 770 A1 | 6/2003 | |
| EP | 1364985 A1 * | 11/2003 | C08J 9/06 |
| EP | 1 374 919 A2 | 1/2004 | |
| EP | 1 457 541 A1 | 9/2004 | |
| EP | 1 462 473 A1 | 9/2004 | |
| EP | 1 510 229 A1 | 3/2005 | |
| EP | 1 516 884 A2 | 3/2005 | |
| EP | 1 577 349 A1 | 9/2005 | |
| EP | 1 589 040 | 10/2005 | |
| EP | 1 598 392 A2 | 11/2005 | |
| EP | 1 801 128 | 6/2007 | |
| EP | 2 135 669 A1 | 12/2009 | |
| GB | 0 235 307 A | 6/1925 | |
| GB | 2 088 392 A | 6/1982 | |
| GB | 2 267 094 A | 11/1993 | |
| JP | 53-046389 B2 | 4/1978 | |
| JP | 54-037188 | 3/1979 | |
| JP | 55-038863 | 3/1980 | |
| JP | 55-133413 | 10/1980 | |
| JP | 56-133028 | 10/1981 | |
| JP | 56-136808 | 10/1981 | |
| JP | 57-073007 | 5/1982 | |
| JP | 57-094011 | 6/1982 | |
| JP | 57-158209 | 9/1982 | |
| JP | 58-501107 | 7/1983 | |
| JP | 58-180233 | 10/1983 | |
| JP | 59-062665 | 4/1984 | |
| JP | 59-080459 | 5/1984 | |
| JP | 59-129232 | 7/1984 | |
| JP | 60-055002 | 3/1985 | |
| JP | 60-071623 | 4/1985 | |
| JP | 60-158861 | 8/1985 | |
| JP | 60-163956 | 8/1985 | |
| JP | 60-245608 | 12/1985 | |
| JP | 60-245608 A | 12/1985 | |
| JP | 61-016903 | 1/1986 | |
| JP | 61-046241 | 3/1986 | |
| JP | 61-087702 | 5/1986 | |
| JP | 61-97333 | 5/1986 | |
| JP | 61-257235 | 11/1986 | |
| JP | 62-007745 | 1/1987 | |
| JP | 62-227904 | 10/1987 | |
| JP | 62-270607 | 11/1987 | |
| JP | 63-105064 | 5/1988 | |
| JP | 63-270741 | 11/1988 | |
| JP | 63-297408 | 12/1988 | |
| JP | 64-056707 | 3/1989 | |
| JP | 01-126310 | 5/1989 | |
| JP | 01-126314 | 5/1989 | |
| JP | 01126314 A * | 5/1989 | |
| JP | 02-049002 | 2/1990 | |
| JP | 02-191604 | 7/1990 | |
| JP | 02-196802 A | 8/1990 | |
| JP | 02-255804 | 10/1990 | |
| JP | 02-300210 | 12/1990 | |
| JP | 3-52903 A | 3/1991 | |
| JP | 03052903 A * | 3/1991 | C08F 20/06 |
| JP | 03-095204 | 4/1991 | |
| JP | 03-115313 | 5/1991 | |
| JP | 03-179008 | 5/1991 | |
| JP | 04-175319 B2 | 6/1992 | |
| JP | 04-227705 A | 8/1992 | |
| JP | 04227705 A * | 8/1992 | |
| JP | 05-202199 B2 | 8/1993 | |
| JP | 5-508674 | 12/1993 | |
| JP | 2001-226416 A | 12/1993 | |
| JP | 06-041319 | 2/1994 | |
| JP | 06-039485 | 3/1994 | |
| JP | 06-057010 | 3/1994 | |
| JP | 06-080818 | 3/1994 | |
| JP | 06-107846 | 4/1994 | |
| JP | 06-122708 | 5/1994 | |
| JP | 06-158658 | 6/1994 | |
| JP | 06-199969 | 7/1994 | |
| JP | 06-211934 | 8/1994 | |
| JP | 06-220227 | 8/1994 | |
| JP | 06-262072 | 9/1994 | |
| JP | 07-008883 | 1/1995 | |
| JP | 07-145326 A | 6/1995 | |
| JP | 07-224204 | 8/1995 | |
| JP | 07-228788 | 8/1995 | |
| JP | 07-242709 | 9/1995 | |
| JP | 08-027278 | 1/1996 | |
| JP | 08-052203 | 2/1996 | |
| JP | 08-057311 | 3/1996 | |
| JP | 08-143782 | 6/1996 | |
| JP | 08-176311 | 7/1996 | |
| JP | 08-188602 | 7/1996 | |
| JP | 02-530668 B2 | 9/1996 | |
| JP | 08-283318 | 10/1996 | |
| JP | 09-077832 | 3/1997 | |
| JP | 09-124710 | 5/1997 | |
| JP | 09-124879 | 5/1997 | |
| JP | 09-136966 | 5/1997 | |

(56) References Cited

FOREIGN PATENT DOCUMENTS

| | | |
|---|---|---|
| JP | 09-235378 | 9/1997 |
| JP | 09-509591 | 9/1997 |
| JP | 09-278900 | 10/1997 |
| JP | 09-290000 | 11/1997 |
| JP | 10-045812 A | 2/1998 |
| JP | 10-075999 | 3/1998 |
| JP | 10-114801 | 5/1998 |
| JP | 10-147724 | 6/1998 |
| JP | 10-273602 | 10/1998 |
| JP | 02-847113 B2 | 1/1999 |
| JP | 11-071425 | 3/1999 |
| JP | 11-071425 A | 3/1999 |
| JP | 11-071529 | 3/1999 |
| JP | 02-881739 B2 | 4/1999 |
| JP | 02-883330 B1 | 4/1999 |
| JP | 11-106514 | 4/1999 |
| JP | 11-240959 | 9/1999 |
| JP | 11-241030 | 9/1999 |
| JP | 11-254429 | 9/1999 |
| JP | 11-258229 | 9/1999 |
| JP | 11-302391 | 11/1999 |
| JP | 11-315147 | 11/1999 |
| JP | 02-995276 B2 | 12/1999 |
| JP | 2000-026738 A | 1/2000 |
| JP | 2000-053729 A | 2/2000 |
| JP | 03-023203 B2 | 3/2000 |
| JP | 03-028203 B2 | 4/2000 |
| JP | 03-031306 B2 | 4/2000 |
| JP | 2000-093792 A | 4/2000 |
| JP | 2000-095965 A | 4/2000 |
| JP | 2000-290381 A | 10/2000 |
| JP | 2000-302876 A | 10/2000 |
| JP | 2000-327926 A | 11/2000 |
| JP | 2001-011341 A | 1/2001 |
| JP | 2001-31770 | 2/2001 |
| JP | 2001-040013 A | 2/2001 |
| JP | 2001-040014 A | 2/2001 |
| JP | 2001-096151 A | 4/2001 |
| JP | 2001-098170 A | 4/2001 |
| JP | 2001-137704 A | 5/2001 |
| JP | 2001-224959 A | 8/2001 |
| JP | 2001-226416 A | 8/2001 |
| JP | 2001226416 A * | 8/2001 ............... C08F 2/44 |
| JP | 2001-252307 A | 9/2001 |
| JP | 2001-523287 A | 11/2001 |
| JP | 2001-523289 A | 11/2001 |
| JP | 2002-035580 A | 2/2002 |
| JP | 2002-085959 A | 3/2002 |
| JP | 2002-121291 A | 4/2002 |
| JP | 03-283570 B2 | 5/2002 |
| JP | 2002-513043 A | 5/2002 |
| JP | 2002-513059 A | 5/2002 |
| JP | 2002-515079 A | 5/2002 |
| JP | 2002-212204 A | 7/2002 |
| JP | 2002-523526 A | 7/2002 |
| JP | 2002-241627 A | 8/2002 |
| JP | 2002-527547 A | 8/2002 |
| JP | 2002-265528 A | 9/2002 |
| JP | 2002-538275 A | 11/2002 |
| JP | 2002-539281 A | 11/2002 |
| JP | 2003-503554 A | 1/2003 |
| JP | 2003-062460 A | 3/2003 |
| JP | 2003-082250 A | 3/2003 |
| JP | 2003-088553 A | 3/2003 |
| JP | 2003-088554 A | 3/2003 |
| JP | 2003-511489 A | 3/2003 |
| JP | 2003-105092 A | 4/2003 |
| JP | 2003-516431 A | 5/2003 |
| JP | 2003-165883 A | 6/2003 |
| JP | 2003-206381 A | 7/2003 |
| JP | 2003-523484 A | 8/2003 |
| JP | 2003-246810 A | 9/2003 |
| JP | 2003-261601 A | 9/2003 |
| JP | 2003-306609 A | 10/2003 |
| JP | 2003-529647 A | 10/2003 |
| JP | 2004-001355 A | 1/2004 |
| JP | 2004-002891 A | 1/2004 |
| JP | 03-501493 B2 | 3/2004 |
| JP | 2004-509196 A | 3/2004 |
| JP | 2004-121400 A | 4/2004 |
| JP | 2004-512165 A | 4/2004 |
| JP | 2004-210924 A | 7/2004 |
| JP | 2004-217911 A | 8/2004 |
| JP | 2004-261796 A | 9/2004 |
| JP | 2004-261797 A | 9/2004 |
| JP | 2004-300425 A | 10/2004 |
| JP | 2004-339678 A | 12/2004 |
| JP | 2004-352941 A | 12/2004 |
| JP | 2005-054050 A | 3/2005 |
| JP | 2005-081204 A | 3/2005 |
| JP | 2005-097585 | 4/2005 |
| JP | 2005-105254 A | 4/2005 |
| JP | 2005-288265 A | 10/2005 |
| JP | 2006-008963 A | 1/2006 |
| JP | 2006-68731 A | 3/2006 |
| JP | 04-046617 B2 | 2/2008 |
| JP | 2008-523196 A | 7/2008 |
| JP | 2008-534695 A | 8/2008 |
| JP | 04-214734 B2 | 1/2009 |
| JP | 2010-065107 A | 3/2010 |
| JP | 05-040780 B2 | 10/2012 |
| JP | 05-156034 B2 | 3/2013 |
| JP | 05-200068 B2 | 5/2013 |
| JP | 05-209022 B2 | 6/2013 |
| RU | 1777603 | 11/1992 |
| RU | 2 106 153 C1 | 3/1998 |
| RU | 2 183 648 C2 | 6/2002 |
| RU | 2 193 045 C2 | 11/2002 |
| SU | 1797612 | 8/1988 |
| TW | 228528 | 8/1994 |
| TW | 396173 B | 7/2000 |
| TW | 399062 B | 7/2000 |
| TW | 422866 B | 2/2001 |
| TW | 432092 B | 5/2001 |
| WO | WO-89/05327 A1 | 6/1989 |
| WO | WO-92/01008 A1 | 1/1992 |
| WO | WO-93/05080 A1 | 3/1993 |
| WO | WO-95/02002 A1 | 1/1995 |
| WO | WO-95/05856 A1 | 3/1995 |
| WO | WO-95/22355 A1 | 8/1995 |
| WO | WO-95/22356 A1 | 8/1995 |
| WO | WO-95/22358 A1 | 8/1995 |
| WO | WO-95/33558 A1 | 12/1995 |
| WO | WO-96/07437 A1 | 3/1996 |
| WO | WO-96/38296 A1 | 12/1996 |
| WO | WO-97/37695 A1 | 10/1997 |
| WO | WO-98/37149 A1 | 8/1998 |
| WO | WO-98/48857 A1 | 11/1998 |
| WO | WO-98/49221 A1 | 11/1998 |
| WO | WO-98/52979 A1 | 11/1998 |
| WO | WO-99/38541 A1 | 8/1999 |
| WO | WO-99/55393 A1 | 11/1999 |
| WO | WO-99/55767 A1 | 11/1999 |
| WO | WO-99/63923 A1 | 12/1999 |
| WO | WO-00/10619 A1 | 3/2000 |
| WO | WO-00/38607 A1 | 7/2000 |
| WO | WO-00/53664 A1 | 9/2000 |
| WO | WO-00/55245 A1 | 9/2000 |
| WO | WO-00/62730 A1 | 10/2000 |
| WO | WO-00/63492 A1 | 10/2000 |
| WO | WO-01/45758 A1 | 6/2001 |
| WO | WO-01/66056 A1 | 9/2001 |
| WO | WO-01/68156 A1 | 9/2001 |
| WO | WO-01/68375 A2 | 9/2001 |
| WO | WO-01/74913 A1 | 10/2001 |
| WO | WO-01/89591 A2 | 11/2001 |
| WO | WO-01/93977 A2 | 12/2001 |
| WO | WO-01/98382 A1 | 12/2001 |
| WO | WO-02/07791 A2 | 1/2002 |
| WO | WO-02/20068 A1 | 3/2002 |
| WO | WO-02/22717 A1 | 3/2002 |
| WO | WO-02/34384 A2 | 5/2002 |
| WO | WO-02/053198 A1 | 7/2002 |
| WO | WO-02/053199 A1 | 7/2002 |

(56) References Cited

FOREIGN PATENT DOCUMENTS

| WO | WO-02/100451 A2 | 12/2002 |
|---|---|---|
| WO | WO-03/014172 A2 | 2/2003 |
| WO | WO-03/026707 A2 | 4/2003 |
| WO | WO-03/051415 A1 | 6/2003 |
| WO | WO-03/051940 A1 | 6/2003 |
| WO | WO-03/078378 A1 | 9/2003 |
| WO | WO-03/095510 A1 | 11/2003 |
| WO | WO-2004/003036 A1 | 1/2004 |
| WO | WO-2004/011046 A1 | 2/2004 |
| WO | WO-2004/018005 A1 | 3/2004 |
| WO | WO-2004/052819 A2 | 6/2004 |
| WO | WO-2004/052949 A1 | 6/2004 |
| WO | WO-2004/061010 A1 | 7/2004 |
| WO | WO-2004/069293 A1 | 8/2004 |
| WO | WO-2004/069404 A1 | 8/2004 |
| WO | WO-2004/069915 A2 | 8/2004 |
| WO | WO-2004/069936 A1 | 8/2004 |
| WO | WO-2004/093930 A1 | 11/2004 |
| WO | WO-2004/113452 A1 | 12/2004 |
| WO | WO-2005/027986 A1 | 3/2005 |
| WO | WO-2005/075070 A1 | 8/2005 |
| WO | WO 2005/097313 A1 | 10/2005 |
| WO | WO-2006/062253 A1 | 6/2006 |
| WO | WO-2006/062258 A2 | 6/2006 |
| WO | WO-2006/063229 A2 | 6/2006 |
| WO | WO 2006/109844 | 10/2006 |
| WO | WO-2006/109882 A1 | 10/2006 |
| WO | WO 2006109882 A1 * | 10/2006 |
| WO | WO-2007/032565 A1 | 3/2007 |
| WO | WO-2007/037522 A1 | 4/2007 |
| WO | WO-2007/116777 A1 | 10/2007 |
| WO | WO-2008/015980 A1 | 2/2008 |
| WO | WO-2008/120742 A1 | 10/2008 |
| WO | WO-2009/048160 A1 | 4/2009 |
| WO | WO-2010/029074 A2 | 3/2010 |
| WO | WO-2010/073658 A1 | 7/2010 |

OTHER PUBLICATIONS

US 6,863,978, 03/2005, Inger et al. (withdrawn).
"Solubility Parameter Values", The Polymer Handbook 3rd Edition, published by Wiley Interscience Publication, pp. 524, 525, 527-539.
A1: *Characterization Analysis* of the patent claims of EP 1 512 712 B1, Apr. 27, 2011.
A6: *The step (B) and the step (D) are performed within 10 minutes in total*, Möglichkeiten zu Merkmal.
BASF Acrylic Acid Glacial, Technical Data Sheet, Mar. 2001.
Belle Lowe (http://www.chestofbooks.com/food/science/Experimental-Cookery/Starch-Part-3.html). Book published 1943.
Buchholz et al., Solution Polymerization, Modern Superabsorbent Polymer Technology, p. 93, 1997.
*Chemistry/Engineering Handbook*, modified version No. 6, edited by Chemistry/Engineering Committee, Maruzen Co. 1999.
Chinese Office Action dated Jul. 17, 2009 issued in Chinese Application No. 200680011103.1 with English translation.
Chinese Office Action dated May 18, 2007 issued in Chinese Application No. 200510076831.8 with English translation.
Chinese Office Action dated Dec. 23, 2013 issued in Chinese Application No. 201210313591.9 with English translation.
Database WPI Week 200454, Thomas Scientific, London, UK, AN 2004-561593, XP0002555199.
Decision to Grant A Patent for an Invention dated Aug. 14, 2009 issued in Russian Application No. 2007140959 with English translation.
Decision to Grant A Patent for an Invention dated Dec. 6, 2007 issued in Russian Application No. 2005140797/04(045428) with English translation.
Decision to Grant dated Aug. 14, 2009 issued in Russian Application No. 2007140959 with English translation.
Definition of "contain" from Merriam-Webster online dictionary, Apr. 2009.
Definition of "involve" from Merriam-Webster online dictionary, Apr. 2009.
European Office Action dated Dec. 2, 2005 issued in European Application No. 05013153.1.
European Search Report dated Dec. 1, 2009 issued in European Application No. 06731732.1.
European Search Report dated Dec. 2, 2009 issued in European Application No. 06731728.9.
European Search Report dated Nov. 26, 2007 issued in European Application No. 06026348.0.
European Search Report dated Jun. 3, 2008 issued in European Application No. 06026110.4.
Hammer mill (Technology), <http://de.wikipedia.org/wiki/Hammermühle (Technik)>, printed Apr. 24, 2011.
http://www.home-water-purifiers-and-filters.com/carbon-water-filter.php, 2011.
Indian Office Action dated Jun. 9, 2011 issued in Indian Application No. 564/CHENP/2008.
International Search Report and International Preliminary Examination Report dated Oct. 12, 2004 issued in PCT Application No. PCT/JP2004/009242.
International Search Report dated Jan. 18, 2011 issued in Japanese Application No. PCT/JP2010/066957 with english translation.
International Search Report dated Apr. 25, 2006 issued in PCT Application No. PCT/JP2006/304895.
International Search Report dated Dec. 5, 2005 issued in PCT Application No. PCT/JP2005/018073.
International Search Report dated Sep. 5, 2006 issued in PCT Application No. PCT/JP2006/311637.
Japanese Office Action dated Mar. 29, 2011 issued in Japanese Application No. 2005-127818 with English translation.
Japanese Office Action dated Dec. 7, 2010 issued in Japanese Application No. 2005-127818 with English translation.
Korean Office Action dated Oct. 27, 2008 issued in Korean Application No. 10-2007-7022676 with English translation.
Kurimoto Powder System, *Continuous Kneading & Reacting System: KRC Kneader*<http://www.kurimoto.co.jp/english/powdersystem/products/krc_Kneader.html> printed Apr. 24, 2011.
Notice of Opposition dated Oct. 17, 2012 issued in EP Application No. 04773399.3 with English translation.
Notice of Opposition dated Apr. 28, 2011 issued in European Application No. 04021015.5 with English translation.
Notice of Opposition dated Oct. 28, 2013 issued in European Application No. 06731728.9 with English translation.
Office Action dated Apr. 1, 2010 issued in U.S. Appl. No. 11/883,621.
Office Action dated Aug. 1, 2012 issued in U.S. Appl. No. 11/693,355.
Office Action dated Jun. 1, 2006 issued in U.S. Appl. No. 10/933,319.
Office Action dated Jan. 10, 2011 issued in U.S. Appl. No. 12/805,685.
Office Action dated Jul. 11, 2012 issued in U.S. Appl. No. 11/883,621.
Office Action dated Feb. 12, 2014 issued in U.S. Appl. No. 11/883,929.
Office Action dated Aug. 14, 2013 issued in U.S. Appl. No. 13/498,780.
Office Action dated Jun. 14, 2010 issued in U.S. Appl. No. 10/562,140.
Office Action dated Mar. 14, 2007 issued in U.S. Appl. No. 10/562,140.
Office Action dated May 14, 2008 issued in U.S. Appl. No. 11/152,195.
Office Action dated Sep. 14, 2009 issued in U.S. Appl. No. 11/883,929.
Office Action dated Apr. 15, 2008 issued in U.S. Appl. No. 10/562,140.
Office Action dated Apr. 15, 2009 issued in U.S. Appl. No. 11/373,215.
Office Action dated Jun. 15, 2009 issued in U.S. Appl. No. 11/693,355.
Office Action dated Oct. 15, 2009 issued in U.S. Appl. No. 11/152,195.
Office Action dated Oct. 16, 2008 issued in U.S. Appl. No. 10/933,319.

(56) References Cited

OTHER PUBLICATIONS

Office Action dated Sep. 16, 2008 issued in U.S. Appl. No. 10/562,140.
Office Action dated Dec. 17, 2013 issued in U.S. Appl. No. 11/883,929.
Office Action dated Feb. 17, 2012 issued in U.S. Appl. No. 10/933,319.
Office Action dated Mar. 17, 2009 issued in U.S. Appl. No. 10/572,565.
Office Action dated Nov. 17, 2009 issued in U.S. Appl. No. 11/579,603.
Office Action dated Dec. 18, 2009 issued in U.S. Appl. No. 11/638,580.
Office Action dated Jun. 18, 2007 issued in U.S. Appl. No. 11/049,995.
Office Action dated Mar. 18, 2010 issued in U.S. Appl. No. 11/883,929.
Office Action dated Mar. 18, 2011 issued in U.S. Appl. No. 11/883,621.
Office Action dated Nov. 18, 2008 issued in U.S. Appl. No. 11/049,995.
Office Action dated Nov. 18, 2010 issued in U.S. Appl. No. 10/562,140.
Office Action dated Oct. 18, 2007 issued in U.S. Appl. No. 10/933,319.
Office Action dated Oct. 18, 2010 issued in U.S. Appl. No. 11/883,621.
Office Action dated Sep. 18, 2009 issued in U.S. Appl. No. 11/641,885.
Office Action dated Mar. 2, 2009 issued in U.S. Appl. No. 11/579,603.
Office Action dated Nov. 2, 2007 issued in U.S. Appl. No. 11/449,666.
Office Action dated Oct. 2, 2013 issued in U.S. Appl. No. 13/498,780.
Office Action dated Jul. 20, 2011 issued in U.S. Appl. No. 10/933,319.
Office Action dated Mar. 20, 2008 issued in U.S. Appl. No. 10/933,319.
Office Action dated Dec. 21, 2010 issued in U.S. Appl. No. 11/579,603.
Office Action dated Jan. 21, 2009 issued in U.S. Appl. No. 11/638,580.
Office Action dated Jun. 21, 2007 issued in U.S. Appl. No. 11/449,666.
Office Action dated May 21, 2010 issued in U.S. Appl. No. 11/638,580.
Office Action dated Mar. 22, 2010 issued in U.S. Appl. No. 11/641,885.
Office Action dated Dec. 23, 2013 issued in U.S. Appl. No. 12/083,238.
Office Action dated Oct. 23, 2006 issued in U.S. Appl. No. 10/933,319.
Office Action dated Sep. 23, 2011 issued in U.S. Appl. No. 12/083,238.
Office Action dated Dec. 24, 2008 issued in U.S. Appl. No. 11/373,215.
Office Action dated Feb. 26, 2010 issued in U.S. Appl. No. 11/693,355.
Office Action dated Jun. 26, 2009 issued in U.S. Appl. No. 11/638,580.
Office Action dated Mar. 26, 2013 issued in U.S. Appl. No. 11/883,621.
Office Action dated Nov. 27, 2009 issued in U.S. Appl. No. 11/693,355.
Office Action dated Aug. 28, 2012 issued in U.S. Appl. No. 12/805,685.
Office Action dated Feb. 28, 2007 issued in U.S. Appl. No. 10/933,319.
Office Action dated Nov. 28, 2012 issued in U.S. Appl. No. 11/693,355.
Office Action dated Oct. 28, 2008 issued in U.S. Appl. No. 11/152,195.
Office Action dated Oct. 28, 2009 issued in U.S. Appl. No. 10/572,565.
Office Action dated Sep. 28, 2007 issued in U.S. Appl. No. 10/562,140.
Office Action dated Apr. 30, 2007 issued in U.S. Appl. No. 11/449,666.
Office Action dated Apr. 30, 2009 issued in U.S. Appl. No. 11/579,603.
Office Action dated Aug. 31, 2010 issued in U.S. Appl. No. 11/883,929.
Office Action dated May 31, 2011 issued in U.S. Appl. No. 12/805,685.
Office Action dated Apr. 4, 2011 issued in U.S. Appl. No. 12/083,238.
Office Action dated Nov. 4, 2010 issued in U.S. Appl. No. 12/805,685.
Office Action dated Sep. 4, 2007 issued in U.S. Appl. No. 11/049,995.
Office Action dated Apr. 5, 2013 issued in U.S. Appl. No. 11/152,195.
Office Action dated Mar. 5, 2013 issued in U.S. Appl. No. 11/693,355.
Office Action dated May 7, 2009 issued in U.S. Appl. No. 11/152,195.
Office Action dated Dec. 8, 2011 issued in U.S. Appl. No. 11/883,621.
Office Action dated Jul. 8, 2010 issued in U.S. Appl. No. 11/579,603.
Office Action dated May 8, 2008 issued in U.S. Appl. No. 11/449,666.
Office Action dated Feb. 9, 2009 issued in U.S. Appl. No. 10/562,140.
Partial European Search Report dated May 25, 2007 issued in European Application No. 06026348.0.
Partial European Search Report dated Jun. 11, 2007 issued in European Application No. 07 10 5112.2.
*Particle Size Analysis and Characterization of Classification Process: 6. Classification Methods*, Ullmann's Enc. Ind. Chem., 6th e.d. (2002) Electronic Release.
Pharmco Products Inc., Sodium Hydroxide 50% Product Specification Sheet (2002).
S. Kishi, "Handbook of Food Additives Edition 1981", Food and Science Company, pp. 285. (Partial English Translation).
S. Kishi: "Handbook of Food Additives Edition 1983", Food and Science Company, pp. 214, 217, 219, 221. (Partial English Translation).
Saxena (ftp://ftp.fao.org/es/esn/jecfa/cta/CTA_61_PVA.pdf) published 2004.
State Intellectual Property Office of the P.R. China Examination Report dated Jan. 20, 2009.
Taiwan Office Action dated Nov. 8, 2011 issued in Taiwanese Application No. 095147238 with English translation.
The Polymer Handbook, 3rd Edition, p. 524 and p. 527-539.
Ulimann's Encyclopedia of Industrial Chemistry (2003, Bd 33:S. 241-242, Bd.8:S. 247-248).
Ulshöfer et al., *Mathematical formula collection for secondary school*, Verlag Konrad Wittwer Stuttgart, 3rd e.d., p. 4, 1988 (with English translation).
www.nichidene.com/Eng/kkh/b/b-2.htm.
Zschimmer & Schwarz (http://www.tandem-chemiscal.com/principles/zschimmer/ceramics_aux/special_info/E_PVAzubereitungen%5B1%5D.pdf) downloaded Dec. 4, 2009.
Supplementary European Search Report dated Jan. 17, 2014 issued in EP Application No. 10820587.3.
Communication pursuant to Rule 114(2) EPC dated Oct. 30, 2014 issued in EP Patent Application No. 05709754.5 which corresponds to Co-pending U.S. Appl. No. 11/049,995.
Office Action dated Sep. 25, 2014 issued in U.S. Appl. No. 12/083,238.
Hearing Notice dated Sep. 25, 2014 issued in Indian Application No. 5101/delnp/2006.
Office Action dated Apr. 4, 2014 issued in U.S. Appl. No. 13/498,780.
"Chemicals Used for Treatment of Water Intended for Human Consumption—Aluminium Sulfate", European Standard, EN 878, *European Committee for Standardization*, Jun. 2004.

(56) References Cited

OTHER PUBLICATIONS

Office Action dated Apr. 1, 2014 issued in Japanese Application No. 2007-080101 with full English translation.

Minutes on the hearing of evidence dated Mar. 20, 2012 concerning European patent No. EP 0 812 873—Full English translation provided.

Affidavit of 10016041 (further experimental reproductions by Dr. Speyerer) dated Oct. 30, 2014.

Appeal brief dated Oct. 30, 2014 submitted by an opponent against European Patent No. EP 1 641 883—Full English translation provided.

Advisory Action dated Feb. 4, 2015 issued in U.S. Appl. No. 12/083,238.

European Office Action dated Apr. 8, 2015 issued in European Patent Application No. 10183241.8.

\* cited by examiner

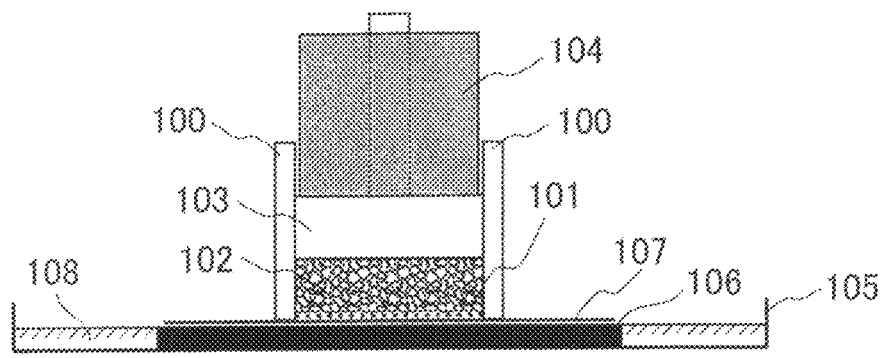

WATER-ABSORBING RESIN AND METHOD FOR MANUFACTURING THE SAME

This Nonprovisional application claims priority under 35 U.S.C. §119(a) on Patent Application No. 083909/2006 filed in Japan on March 24, 2006, the entire contents of which are hereby incorporated by reference.

FIELD OF THE INVENTION

The present invention relates to a water-absorbing resin and a method for manufacturing the water-absorbing resin. More specifically, the present invention relates to (i) a water-absorbing resin whose particle size distribution is controlled, the amount of fine powder of which is small, whose impact resistance (powder abrasion resistance) is high and whose absorption rate is high, and (ii) a method for manufacturing the water-absorbing resin.

BACKGROUND OF THE INVENTION

In recent years, a water-absorbing resin that is one example of a hydrophilic polymer has been widely used in various applications, such as sanitary goods (disposable diapers, sanitary napkins, adult incontinence products, etc.) and humectants for soil, and the water-absorbing resin has been produced and consumed massively. Especially, in the case of the application of the sanitary goods, such as disposable diapers, sanitary napkins and adult incontinence products, the amount of water-absorbing resin used tends to be increased whereas the amount of pulp fiber tends to be reduced for the purpose of reducing the thickness of the product. Here, there is a demand for the water-absorbing resin having a high absorption capacity under load and meanwhile there is a demand for a low-cost manufacturing since the amount of water-absorbing resin used for each sanitary goods is large. Therefore, there is a demand for a reduction in an energy consumption at a manufacturing line of the water-absorbing resin, a reduction in the amount of wastes, and an establishment of a rational manufacturing method realized by these reductions.

As desired properties of the water-absorbing resin, there are a high absorption capacity, a high absorption capacity under load, a high absorption rate, a small amount of residual monomer, a small amount of water extractable polymer. Among these properties, the improvement of the absorption rate is one of the basic objects regarding the water-absorbing resin, and many methods for improving the absorption rate have already been proposed.

The absorption rate depends largely on a specific surface area. Therefore, in a method for reducing a particle diameter, there are problems of deterioration of other physical properties, such as the generation of dust and deterioration of liquid permeability. Here, many methods, such as foaming and agglomerating, for improving the rate have been proposed, and known methods are, for example, (i) a method for dispersing solid matters (solids) and carrying out foaming polymerization (Document 1), (ii) a method for dispersing gas and carrying out foaming polymerization (Document 2), (iii) a method for carrying out foaming polymerization using carbonate (Documents 3 and 4), (iv) a method for carrying out foaming polymerization using 0.1% to 20% of a surfactant (Documents 5 and 6), (v) a method for agglomerating water-absorbing resin by extruding them from an aspheric die (Document 7), (vi) a method for agglomerating water-absorbing resin fine particles using a polyvalent metal (Document 8), (vii) a method for heating water-absorbing resin using a microwave (Document 9), and (viii) a method for incorporating a filler (Document 10).

Moreover, another known method is a method for polymerizing, by carrying out foaming polymerization, a slurry of minute precipitate of sodium salt of acrylic acid, containing micro bubbles of an inactive gas (Document 11).

In a method for improving the absorption rate by increasing the surface area by reducing the particle diameter, the increase in the amount of fine powder causes the deterioration of other physical properties. Moreover, in a method for agglomerating the water-absorbing resins to improve the absorption rate, its process is complicated. In addition, since the intensity of the agglomerating is generally low, there are problems, such as the generation of dust and deterioration of other physical properties. Further, in a method of the foaming, an additional foaming agent, surfactant and/or the like are required, and in addition, there are problems, such as (i) an increase in cost of transportation and warehousing due to deterioration of a bulk specific gravity by the foaming and (ii) the generation of fine powder and deterioration of physical properties since foamed particles are weak. Further, in the foaming polymerization, there are problems, such as an increase in the amount of residual monomer and a difficulty of improving the absorption capacity under load (AAP, Absorbency Against Pressure).

Moreover, in the case of conventional water-absorbing resins, it is difficult or impossible to control, within respective preferable ranges, all of the physical properties, such as a water-absorbing rate, the absorption capacity under load, the particle size and the amount of residual monomer. In addition, even if the water-absorbing resin whose all physical properties are controlled within respective preferable ranges is obtained and in the case of manufacturing diapers on a large scale using this water-absorbing resin, the diaper may not provide its performance which has been provided in an experimental laboratory.

As a result of a study on the reason why the diaper does not provide its performance, it is found that in a case where the water-absorbing rate is improved (when foaming or agglomerating is carried out), the water-absorbing resin is damaged when it is transported, for example, on a line at a factory, and the fine powder is easily generated, and therefore, for example, the performance of the diaper deteriorates when the water-absorbing resin is used in the diaper.

On this account, there is a need for the water-absorbing resin whose performance is improved so that the diaper can perform maximally. Specifically, there is a need for the water-absorbing resin whose water-absorbing rate is high and which is not easily damaged (which does not generate the fine powder easily).

[Document 1] U.S. Pat. No. 5,985,944 (published on Nov. 16, 1999)

[Document 2] U.S. Pat. No. 6,107,358 (published on Aug. 22, 2000)

[Document 3] U.S. Pat. No. 5,712,316 (published on Jan. 27, 1998)

[Document 4] U.S. Pat. No. 5,462,972 (published on Oct. 31, 1995)

[Document 5] U.S. Pat. No. 6,136,973 (published on Oct. 24, 2000)

[Document 6] U.S. Pat. No. 6,174,929 (published on Jan. 26, 2001)

[Document 7] U.S. Pat. No. 6,133,193 (published on Oct. 17, 2000)

[Document 8] U.S. Pat. No. 5,002,986 (published on Mar. 26, 1991)

[Document 9] U.S. Pat. No. 6,076,277 (published on Jun. 20, 2000)
[Document 10] U.S. Pat. No. 6,284,362 (published on Sep. 4, 2001)
[Document 11] Japanese Unexamined Patent Publication No. 115313/1991 (Tokukaihei 3-115313 (published on May 16, 1991))

SUMMARY OF THE INVENTION

The present invention was made to solve the above problems, and an object of the present invention is to provide a highly productive method for manufacturing a water-absorbing resin, the amounts of fine powder and dust of which are small, the amount of residual monomer of which is small, and whose absorption rate is high.

As a result of diligent studies in light of the above problems, the present inventors have found that the above problems can be solved by, in a water-absorbing resin manufacturing method for crosslinking and polymerizing an aqueous solution of an acid-group containing unsaturated monomer, causing the monomer aqueous solution to contain solid matters (solids) and carrying out high-temperature polymerization defined by (i) a polymerization initiation of a high temperature that is a specific temperature or more or (ii) a high-temperature polymerization peak of a specific temperature or more. Thus, the present invention has been completed. That is, the present inventors have found that by carrying out the high-temperature polymerization of a specific temperature or more and crosslinking and polymerizing the monomer aqueous solution containing the solids (preferably, water-insoluble particles), it is possible to obtain, through an easier and highly productive process, a water-absorbing resin whose absorption rate is improved, and the amount of residual monomer of which is reduced.

Moreover, as a result of a study on the reason why the performance of the diaper using the water-absorbing resin whose water-absorbing rate is high is insufficient in practice, the present inventors have found that the particles of the water-absorbing resin break down at the time of transportation or in a diaper manufacturing process, so that the physical properties of the water-absorbing resin in the diaper deteriorate significantly. Further, the present inventors have found that the water-absorbing resin of the present invention containing the fine particles or the water-absorbing resin having a specific water-absorbing performance can solve the above problems and maintain high performance even in the diaper, so that it is possible to provide excellent diapers.

That is, a method for manufacturing a water-absorbing resin of the present invention is a water-absorbing resin manufacturing method for crosslinking, preferably crosslinking and polymerizing, an aqueous solution of an acid-group containing unsaturated monomer, and is characterized in that stationary polymerization whose initiation temperature is adjusted to 40° C. or more or whose maximum temperature is adjusted to 100° C. or more is carried out in the presence of solid matters (preferably, water-insoluble solid matters) added to the monomer aqueous solution.

Moreover, a water-absorbing resin particle of the present invention is a water-absorbing resin particle whose repeating unit is acrylic acid (salt) of 70 mole % to 99.999 mole % and a crosslinking agent of 0.001 mole % to 5 mole %, and satisfies (1) to (6) below.

(1) The absorption capacity (CRC, Centrifuge Retention Capacity) is 20 g/g to 40 g/g.
(2) The absorption capacity under load (AAP) is 20 g/g to 40 g/g.
(3) The absorption rate (FSR, Free Swell Rate) is 0.25 g/g/sec to 1.0 g/g/sec.
(4) The bulk specific gravity (JIS K 3362) is 0.50 g/ml to 0.80 g/ml.
(5) The residual monomer is 0 ppm to 400 ppm.
(6) Particles (JIS Z8801-1) of 850 µm to 150 µm are 95 weight % to 100 weight %.

Additional objects, features, and strengths of the present invention will be made clear by the description below. Further, the advantages of the present invention will be evident from the following explanation in reference to the drawing.

BRIEF DESCRIPTION OF THE DRAWINGS

FIG. 1 is a diagram showing an apparatus which measures an absorption capacity under load (AAP) when measuring physical properties of a water-absorbing resin in Examples of the present invention.

DESCRIPTION OF THE EMBODIMENTS

The following will explain one embodiment of the present invention in detail. However, the present invention is not limited to the following explanations, but may be altered in many variations, provided such variations do not exceed the scope of the present invention.

Note that in the following explanations, "weight" is synonymous with "mass", "weight %" is synonymous with "mass %", "major component" is a component, the amount of which in something is 50 mass % or more (more preferably, 60 mass % or more). Moreover, a range "A to B" is a range not less than A but not more than B.

Moreover, in the present specification, "(meth)acryl", "(meth)acryloyl" and "(meth)acrylate" mean "acryl or methacryl", "acryloyl or methacryloyl" and "acrylate or methacrylate", respectively, and "acrylic acid (salt)" means "acrylic acid or acrylate". Note that the above "acrylate" especially means a monovalent salt.

(Water-absorbing Resin)

A water-absorbing resin of the present invention is a crosslinked polymer which may form a hydrogel and has a water-swelling property and a water insolubility. The crosslinked polymer having the water-swelling property is a crosslinked polymer which absorbs, in ion-exchange water, the water five times its own weight at minimum, preferably 50 times to 1,000 times its own weight. The crosslinked polymer having the water insolubility is a crosslinked polymer containing a not-crosslinked water-soluble component (water-soluble polymer), the amount of which is preferably 0 mass % to 50 mass %, more preferably 25 mass % or less, further preferably 20 mass % or less, yet further preferably 15 mass % or less, and especially preferably 10 mass % or less.

(Monomer)

Examples of a monomer which is used in the present invention and becomes a water-absorbing resin by polymerization are (i) an anionic unsaturated monomer, such as acrylic acid, methacrylic acid, maleic acid, maleic anhydride, β-acryloyloxypropionic acid, fumaric acid, crotonic acid, itaconic acid, cinnamic acid, vinyl sulfonic acid, allyltoluenesulfonic acid, vinyltoluenesulfonic acid, styrene sulfonic acid, 2-(meth)acrylamide-2-methylpropanesulfonic acid, 2-(meth)acryloyl ethanesulfonic acid, 2-(meth)acryloyl propanesulfonic acid and 2-hydroxyethyl (meth)acryloyl phosphate, and its salt; (ii) a mercapto-group containing unsaturated monomer; (iii) a phenolic-hydroxyl-group containing unsaturated monomer; (iv) an amide-group containing unsaturated monomer, such as (meth)acrylamide, N-ethyl (meth)acrylamide, and N,N- dimethyl (meth)acrylamide; and (v) an amino-group containing unsaturated monomer, such as N,N-dimethylaminoethyl (meth)acrylate, N,N-dimethylaminopropyl (meth) acrylate, and N,N-dimethylaminopropyl (meth)acrylamide.

These monomers may be used alone or may be used by accordingly mixing two kinds or more. In light of the performance and cost of the water-absorbing resin to be obtained, it is preferable to use, as the major component, acrylic acid and/or its salt (Examples are salts of sodium, lithium, potassium, ammonium, and amines. Among these, sodium salt is preferable in light of physical properties.).

A neutralization ratio of acrylic acid before or after the polymerization is preferably from 30 mole % to 100 mole %, more preferably from 50 mole % to 85 mole %, further preferably from 55 mole % to 80 mole %, and most preferably from 60 mole % to 75 mole %.

Moreover, the amount of acrylic acid and/or its salt with respect to the whole monomers (except for a crosslinking agent) is preferably from 50 mole % to 100 mole %, more preferably 50 mole % or more, further preferably 80 mole % or more, and especially preferably 95 mole % or more.

A concentration of the monomer is not especially limited, but is usually 20 weight % or more, preferably 30 weight % or more, more preferably 35 weight % or more, further preferably 40 weight % or more, especially preferably 45 weight % or more, and most preferably 50 weight % or more. The upper limit of the concentration of the monomer is a saturated concentration of the monomer, or is 80 weight % or less, preferably 70 weight % or less, and more preferably 60 weight % or less. When the concentration of the monomer is less than 20 weight %, the absorption rate may not improve. Moreover, also known is a water-absorbing resin manufacturing method (Japanese Unexamined Patent Publication No. 115313/1991 (Tokukaihei 3-115313)) in which sodium acrylate is polymerized using a slurry water dispersion whose concentration exceeds the saturated concentration. However, when the concentration of the monomer exceeds the saturated concentration of the monomer or 80 weight %, the absorption capacity tends to be low. Note that the saturated concentration of the monomer depends on the type of the monomer, the temperature of the monomer solution, the type of a solvent, the type and adding amount of an auxiliary agent (for example, a surfactant), etc.

In the present invention, a method for obtaining the water-absorbing resin having a crosslinked structure is to carry out the polymerization by adding the crosslinking agent to the monomer. Moreover, at the same time, it may be possible to use a known crosslinking method, such as radical self crosslinking or radiation crosslinking at the time of polymerization, for obtaining a water-absorbing resin.

An internal crosslinking agent to be used is not limited as long as it can form the crosslinked structure at the time of polymerization, and examples of the internal crosslinking agent are (i) a crosslinking agent containing a plurality of polymerizable unsaturated groups, (ii) a crosslinking agent, such as glycidyl acrylate, containing both a polymerizable unsaturated group and a highly reactive group, (iii) a crosslinking agent, such as sorbitol (for example, see a pamphlet of International Publication No. 2006/319627) or (poly) ethylene glycol diglycidyl ether, containing a plurality of highly reactive groups, (iv) an ionic crosslinking agent, such as polyvalent metal salt (for example, aluminum chloride), and (v) a crosslinking agent, such as glycerin, containing a plurality of hydroxyl groups. Moreover, these internal crosslinking agents may be used in combination. However, the crosslinking agent containing a plurality of polymerizable unsaturated groups is most preferable in light of physical properties. The crosslinking agent, to be used, containing a plurality of polymerizable unsaturated groups is, for example, one or two or more of N,N'-methylene bisacrylamide, (poly)ethylene glycol di(meth)acrylate, (polypropylene glycol di(meth)acrylate, trimethylolpropane tri(meth) acrylate, trimethylolpropane di(meth)acrylate, trimethylolpropane tri(β-acryloyloxypropionate), polyethylene glycol di(β-acryloyloxypropionate), (meth)allyloxyalkane, glycerin acrylate methacrylate, etc. Note that the amount of the crosslinking agent to be used is determined accordingly depending on the type of the crosslinking agent and the target water-absorbing resin, but is usually from 0.001 mole % to 5 mole % with respect to the acid-group containing polymerizable monomer, preferably from 0.005 mole % to 4 mole %, and more preferably from 0.01 mole % to 1 mole %.

As above, in the present invention, it is preferable to contain, as a repeating unit, 70 mole % to 99.999 mole % of acrylic acid (salt) and 0.001 mole % to 5 mole % of the crosslinking agent.

In addition, it may be possible to add, to the monomer, about 0 mass % to 30 mass % of a water-soluble polymer (such as starch, poval, PEG, or PEO), a chain transfer agent (such as hypophosphorous acid (salt)), and a chelating agent (described later).

(Solid Matter)

A compound to be dispersed in the monomer aqueous solution is a compound which is insoluble or is hardly soluble but is dispersible in an aqueous solution whose temperature is in a range preferably from 0° C. to 40° C., more preferably from 10° C. to 30° C., and especially preferably 25° C. (the pressure is a normal pressure (1 atmospheric pressure)). Moreover, the solid matter (solid) is preferably a water-insoluble particle.

As the solid matter (hereinafter sometimes referred to as "solid" or "solid substance"), it is possible to use various solid substances, such as inorganic substances, organic substances, and organic-inorganic complex substances. Examples of the solid matter are (i) inorganic substances, such as bentonite, zeolite, silicon oxide, aluminum oxide, and activated carbon and (ii) organic substances, such as crosslinked polyacrylic acid (salt), polyacrylamide, crosslinked polyacrylamide, acrylic acid (salt)-acrylamide crosslinked copolymer, a cationic monomer-polyacrylamide crosslinked copolymer (such as N,N-dimethylaminoethyl (meth)acrylate and its quaternary salt), and a crosslinked polycation compound (such as polyethylenimine, polyvinylamine, and polyallylamine). Further examples of the solid matter are a complex of an organic substance and an inorganic substance, and a blend of an organic substance and an inorganic substance. Note that the solid may be swollen in the monomer aqueous solution so as to be in the form of a gel. In the present invention, the gel which disperses but does not dissolve in the monomer is regarded as the solid.

The shape of the solid matter (solid) is not especially limited, and may be in the form of a fiber or a particle. However, the particle is more preferable since its surface area is large and it can accelerate foaming more effectively.

It is preferable that the solid matter (solid) be usually a powdery (particulate) compound which is solid at normal temperature. The particle diameter of 90 weight % or more (the upper limit is 100 mass %) of the compound is preferably 5 mm or less, more preferably 3 mm or less, further preferably 1 mm or less, and especially preferably 150 μm or less. It is not preferable that the particle diameter of the powder exceed 5 mm, since the number of bubbles in the water-absorbing resin reduces and it may be necessary to carry out pulverizing.

Moreover, it is more preferable that each particle diameter of substantially all the particles (99.9 weight % or more) of the solid matter (solid) be in a range from 1 nm to 5 mm, and it is most preferable that each particle diameter of all the particles of the solid matter (solid) be in a range from 5 nm to 1 mm. If the particle diameter of the powder is less than 1 nm, it may be difficult to uniformly mix the powder in the monomer aqueous solution.

The particle size of particles each of whose particle size is 38 μm or more may be measured by a sieve classification using a standard sieve (JIS Z8801-1 (2000)). The particle size of particles each of whose particle size is 38 μm or less may be measured by a laser analysis type particle size distribution measuring apparatus. Specifically, regarding the above compound to be dispersed, insoluble in room-temperature water is preferably 70 weight % or more of the compound, more preferably 80 weight % or more of the compound, further preferably 90 weight % or more of the compound, yet further preferably 95 weight % or more of the compound, and especially preferably 98 weight % or more of the compound.

In the present invention, preferably used as the solid matter (solid) is a polyacrylic acid (salt) crosslinked polymer, that is, a polyacrylic acid (salt) based water-absorbing resin. The solid is dry powder of the water-absorbing resin or a swollen gel particle of the water-absorbing resin.

To achieve the present invention in the case of using the polyacrylic acid (salt) based water-absorbing resin, the lower its absorption capacity (CRC) is, the better. The absorption capacity (CRC) is usually 50 g/g or less, preferably 40 g/g or less, further preferably 30 g/g or less, and especially preferably 20 g/g or less. The lower limit of the absorption capacity is 5 g/g or more, and preferably 10 g/g or more. Moreover, an extractable polymer content is preferably 30% or less, more preferably 15% or less, further preferably 10% or less, and especially preferably 5% or less. That is, in the present invention, the solid matter (solid) is preferably the water-absorbing resin whose absorption capacity (CRC) with respect to a physiological saline solution is 5 g/g to 20 g/g.

The polyacrylic acid (salt) based water-absorbing resin may be manufactured separately, or may be fine powder or coarse particles removed for particle size control. That is, after removing the fine powder and/or the coarse particles in a step of manufacturing the water-absorbing resin, they are not discarded but are used as the solid matter (solid) of the present invention. Thus, it is possible to carry out the particle size control and improve the absorption rate.

Moreover, the concentration of the solid (preferably, the water-absorbing resin) with respect to the monomer may be set accordingly depending on the target performance, but the concentration of the solid with respect to the monomer is usually 0.1 weight % or more, preferably 1 weight % or more, more preferably 3 weight % or more, further preferably 5 mass % or more, and especially preferably 10 mass % or more. The upper limit of the concentration of the solid with respect to the monomer is usually 50 weight % or less, preferably 40 weight % or less, more preferably 30 mass % or less, and further preferably 20 weight % or less. If this concentration is less than 0.1 weight %, the addition of the solid produces substantially no effect. Moreover, if this concentration exceeds 50 weight %, the absorption capacity or the like may deteriorate.

Moreover, a method for dispersing the solid matter (solid) is not especially limited, and examples of the method are (i) a method for putting and dispersing the solid matters in a liquid monomer or a monomer aqueous solution in a tank, (ii) a method for continuously dispersing, using a mixer, the solid matters in the above liquid flowing continuously, (iii) a method for scattering the solid matters in the monomer aqueous solution supplied in a polymerization apparatus, and mixing them according to need to disperse the solid matters, and (iv) a method for scattering the solids in the polymerization apparatus, supplying the monomer aqueous solution in the polymerization apparatus, and mixing them according to need to disperse the solids. By dispersing the compound in this manner, it is possible to uniformly disperse the compound in the monomer aqueous solution.

In the case of carrying out, as the dispersing method, continuous stationary polymerization using an endless belt (described later), preferable methods are a method for dispersing the solid matters in the monomer aqueous solution supplied on the endless belt and a method for dispersing the solid matters before supplying the monomer aqueous solution on the endless belt. The former is more preferable.

The above dispersing method is more preferable than a method of putting the solid matters in advance in a tank for preparing the monomer aqueous solution or a method for carrying out line mixing, since troubles due to the solid matter accumulating locally do not occur.

Further, since it is possible to intermittently disperse the solid matters in the above dispersing method (that is, since it is possible to disperse the solid matters or stop dispersing the solid matters), it is possible to accordingly adjust the amount of solid matter to be dispersed, without stopping the stationary polymerization (that is, it is possible to accordingly adjust the amount of solid matter to be dispersed, while continuously carrying out the stationary polymerization).

In the above method for dispersing the solid matters in the monomer aqueous solution supplied on the endless belt, the timing for dispersing the solid matters is not especially limited as long as it is before the termination of the polymerization of the monomer aqueous solution. However, in light of the execution of the more effective foaming polymerization, it is more preferable that the solid matters be dispersed in the monomer aqueous solution immediately after the initiation of the polymerization (specifically, within ten seconds from the initiation of the polymerization).

(Polymerization)

A polymerization of the present invention is a stationary aqueous polymerization, and the stationary polymerization needs to be carried out such that an initiation temperature of the polymerization is 40° C. or more or a maximum temperature is 100° C. or more. When the polymerization of the present invention is not the stationary polymerization, for example, when the polymerization of the present invention is a reversed phase suspension polymerization or an aqueous solution stirring polymerization, the absorption rate of the obtained water-absorbing resin does not improve even if the solid is contained. Moreover, the absorption rate does not improve when the initiation temperature of the polymerization is not 40° C. or more or the maximum temperature is not 100° C. or more. Note that known as a stirring aqueous polymerization is a kneader polymerization (U.S. Patent Application Publication No. 2004-110897, U.S. Pat. Nos. 670,141, 4,625,001 and 5,250,640, etc.). Since, in this polymerization, the stirring is being carried out throughout the polymerization, the absorption rate of the obtained water-absorbing resin does not improve so much. Therefore, this polymerization is not applied to the present invention.

Note that the stationary polymerization is a polymerization method for causing a polymerization reaction to proceed without stirring the monomer aqueous solution using a stirrer or the like. Note that strictly speaking, in the case of carrying out the stationary polymerization after putting a polymerization initiator in the monomer aqueous solution and uniformly mixing the monomer aqueous solution, the stirring is being carried out during the polymerization reaction. However, in the present specification, such a method is also regarded as the stationary polymerization.

That is, specifically, the stationary polymerization in the present specification is a polymerization method for causing the polymerization reaction to proceed without stirring the monomer aqueous solution after at least 30 seconds from the initiation of the polymerization. During the polymerization, the stirring or the gel crushing may be carried out, but the stationary polymerization in the present specification is more preferably a polymerization method for causing the polymerization reaction to proceed without stirring the monomer aqueous solution at all after the initiation of the polymerization. Note that in an embodiment (described later) using the endless belt, the monomer aqueous solution is moved wholly, but the monomer aqueous solution is not stirred. Therefore, this embodiment is regarded as the stationary polymerization.

Note that the reversed phase suspension polymerization is a polymerization method for causing the monomer aqueous solution to be suspended in a hydrophobic organic solvent, and is descried in, for example, U.S. Pat. Nos. 4,093,776, 4,367,323, 4,446,261, 4,683,274, 5,244,735, etc. The aqueous polymerization is a method for polymerizing the monomer aqueous solution without a dispersion solvent, and is described in, for example, U.S. Pat. Nos. 4,625,001, 4,873, 299, 4,286,082, 4,973,632, 4,985,518, 5,124,416, 5,250,640, 5,264,495, 5,145,906, 5,380,808, etc. and European Patent Nos. 0811636, 0955086, 0922717, etc. Monomers, crosslinking agents, polymerization initiators, and other additives described in these patent documents are applicable to the present invention as long as they are used for the stationary aqueous polymerization.

(Polymerizer)

Although the stationary polymerization may be carried out batchwise, the continuous stationary polymerization (for example, U.S. Patent Application Publication No. 2005-215734) using the endless belt is preferable. The belt is preferably made of a resin or rubber so that the heat of polymerization does not easily radiate from a contact surface thereof. Moreover, to improve the absorption rate, it is preferable that there be an open space above a polymerization container. Moreover, when the monomer aqueous solution containing the monomer, the polymerization initiator, the crosslinking agent, and a dispersion solid is supplied on the belt, the thickness of the monomer aqueous solution (or the gel) on the belt is usually and preferably 1 mm to 100 mm, more preferably 3 mm to 50 mm, and most preferably 5 mm to 30 mm. If this thickness of the monomer aqueous solution on the belt is 1 mm or less, it is difficult to adjust the temperature of the monomer aqueous solution. If this thickness of the monomer aqueous solution on the belt is 100 mm or more, it is difficult to remove the heat of polymerization. In either case, such a difficulty becomes a cause of deteriorating the physical properties of the water-absorbing resin. Moreover, although the rate of the endless belt depends on the length of the polymerizer, it is usually and preferably 0.3 meter per minute to 100 meters per minute, more preferably 0.5 meter per minute to 30 meters per minute, most preferably 1 meter per minute to 20 meters per minute. It is not preferable that the rate of the belt be lower than 0.3 meter per minute, since the productivity deteriorates. Moreover, it is not preferable that the rate of the belt be higher than 100 meters per minute, since the polymerizer becomes large.

That is, a polymerization method of the present invention is a method for continuously manufacturing a water-absorbing resin using a continuous polymerizer including (i) an opening for putting therein a monomer aqueous solution containing a monomer, a polymerization initiator, a crosslinking agent and a dispersion solid, (ii) an endless belt for conveying the monomer and the produced hydrated polymer, and (iii) an opening for discharging the hydrated polymer, and it is preferable that this method satisfy the following conditions.

A method for continuously manufacturing a water-absorbing resin, using the continuous polymerizer whose side surfaces and ceiling surface are covered and whose apparatus porosity defined by Formula 1 below is in a range from 1.2 to 20.

$$\text{Apparatus Porosity} = B/A \quad \text{Formula 1.}$$

A (cm$^2$); A maximum area of a cross section of the hydrated polymer at the time of polymerization, the cross section being taken along a width direction of the endless belt B (cm$^2$); A maximum area of a cross section of a space between the endless belt of the continuous polymerizer and the ceiling surface of the continuous polymerizer, the cross section being taken along the width direction of the endless belt Moreover, it is preferable that the polymerization method of the present invention further satisfy the following conditions.

The method as set forth in claim 1 or 2, being a continuous manufacturing method, wherein an apparatus height ratio defined by Formula 3 below is in a range from 10 to 500.

$$(\text{Belt Ratio}) = E/D \quad \text{Formula 3.}$$

D (cm); The thickness of the monomer aqueous solution on the belt

E (cm); A maximum height from the endless belt to the ceiling surface of the continuous polymerizer In the stationary polymerization method of the present embodiment, the polymerization is carried out under such a state that the foaming is increased more. Therefore, it is possible to obtain a polymer whose surface area is increased by bubbles. On this account, in the case of carrying out the polymerization using the above-described endless belt, the polymer to be obtained does not adhere to the belt, and the polymer to be obtained can be removed from the belt easily. Therefore, it is not necessary to carry out an operation of, for example, forcibly scraping the polymer off the belt. As a result, a load to the belt is reduced, and it is possible to lengthen the period of use of the belt.

(Initiation Temperature of Polymerization)

To improve the absorption rate, the initiation temperature of the polymerization of the present invention is necessarily 40° C. or more, preferably 50° C. or more, more preferably 60° C. or more, further preferably 70° C. or more, and especially preferably 80° C. or more, and its upper limit is 150° C. or less, usually 110° C. or less, and preferably 100° C. or less. The absorption rate does not improve if the initiation temperature is low. Moreover, if the initiation temperature is too high, the absorption capacity deteriorates, the extractable polymer content increases, and the physical properties of the water-absorbing resin deteriorate. Moreover, a good point of the present invention is that the removal of the dissolved oxygen becomes easy by increasing the initiation temperature (monomer temperature) of the polymerization. If the initiation temperature of the polymerization is lower than 40° C., the foaming polymerization is not realized. Further, the productivity deteriorates since an induction period and a polymerization time increase, and in addition, the physical properties of the water-absorbing resin deteriorate.

The initiation temperature of the polymerization can be observed by the opaqueness, viscosity rise, temperature rise, etc. of the monomer aqueous solution. Note that the initiation temperature of the polymerization and the maximum temperature of the polymerization can be measured by a commonly used mercury thermometer, alcohol thermometer, platinum thermal resistance, contact-type temperature sensor (such as a thermocouple or a thermistor) or radiation thermometer. Since the induction period of an active energy ray (such as ultraviolet), redox polymerization by an oxidizing agent and a reducing agent, thermal initiation polymerization by an azo initiator, or the like is generally from about 1 second to 1 minute, that is, the induction period of each of those is generally short, the initiation temperature of the polymerization may be defined by the temperature of the monomer aqueous solution before the addition of the initiator or before the irradiation of the active energy.

(Maximum Temperature)

In the present invention, the maximum temperature of the polymerization is defined by a maximum end-point temperature of a polymerized gel or monomer in process of the polymerization. To improve the absorption rate, the maximum temperature of the polymerization is necessarily 100° C. or more, preferably 105° C. or more, more preferably 110° C. or more, further preferably 115° C. or more, and especially preferably 120° C. or more, and its upper limit is 150° C. or less, usually 140° C. or less, and preferably 130° C. or less. The absorption rate does not improve if the maximum temperature is low. Moreover, if the maximum temperature is too high, the absorption capacity deteriorates, the extractable polymer content increases, and the physical properties of the water-absorbing resin deteriorate.

Note that as a method for measuring the temperature of a polymerization system, it is possible to use a PC card type data collection system "NR-1000" produced by Keyence Corporation. Specifically, a thermocouple is placed at the center of the polymerization system, and the measurement is carried out with a sampling cycle of 0.1 second. The initiation temperature of the polymerization and a peak temperature (maximum end-point temperature) are read from a Temperature-Time chart thus obtained.

Moreover, in the present invention, a difference $\Delta T$ between the initiation temperature of the polymerization and the maximum end-point temperature during the polymerization exceeds 0° C. and is preferably 70° C. or less, more preferably 60° C. or less, further preferably 50° C. or less, yet further preferably 40° C. or less, still further preferably 30° C. or less, and most preferably 25° C. or less. It is not preferable that the difference $\Delta T$ be higher than 70° C., since the absorption rate of the water-absorbing resin to be obtained may deteriorate. As one example of obtaining such a heat of polymerization that the temperature during the polymerization is the above temperature, the monomer concentration is set to be more preferably 30 weight % or more.

(Polymerization Initiator)

The polymerization initiator used in the present invention is not especially limited, and it is possible to use (i) a thermally decomposable initiator (for example, persulfate (sodium persulfate, potassium persulfate, ammonium persulfate), peroxide (hydrogen peroxide, t-butyl peroxide, methyl ethyl ketone peroxide), an azo compound (an azo nitryl compound, an azo amidine compound, a cyclic azo amidine compound, an azo amide compound, an alkyl azo compound, 2,2'-azobis(2-amidinopropane) dihydrochloride, 2,2'-azobis[2-(2-imidazoline-2-yl)propane] dihydrochloride) or (ii) an optically decomposable initiator (for example, a benzoin derivative, a benzil derivative, an acetophenone derivative, a benzophenone derivative, an azo compound).

In light of the cost and its performance of reducing the residual monomer, persulfate is preferable. Moreover, it is also preferable to use the optically decomposable initiator and ultraviolet. It is more preferable to use both the optically decomposable initiator and the thermally decomposable initiator. The amount of the polymerization initiator with respect to the monomer is in a range from usually 0.001 mole % to 1 mole %, preferably 0.01 mole % to 0.5 mole %, and further preferably 0.05 mole % to 0.2 mole %.

(Polymerization Time)

The polymerization time is not especially limited, but is usually 15 minutes or less, preferably 10 minutes or less, more preferably 5 minutes or less, further preferably 3 minutes or less, yet further preferably 2 minutes or less, and especially preferably 1 minute or less. It is not preferable that the polymerization time exceed 15 minutes (especially 5 minutes), since the productivity of the polymer (hydrated polymer, base polymer, and water-absorbing resin) to be obtained deteriorates. In some cases, the physical properties, such as the absorption rate, also deteriorate.

Here, the polymerization time can be obtained by counting time from (i) when the monomer aqueous solution is put in a polymerization container and conditions of the initiation of the polymerization are set (in the case of using the optically decomposable initiator, when light irradiation is started/in the case of not using the optically decomposable initiator, when the monomer aqueous solution and the polymerization initiator are put in the polymerization container) to (ii) when the temperature reaches the peak temperature. That is, the polymerization time can be obtained by adding the induction period to time from when the polymerization is initiated to when the temperature reaches the peak temperature.

(Means For Adjusting Initiation Temperature)

To set the temperature of the monomer to 40° C. or more, the polymerization container itself may be heated, or the monomer aqueous solution may be heated in advance (for example, may be heated to 40° C. or more in a line) when supplying it to the polymerization container. Although the temperature of the monomer may be set to 40° C. or more by the above external heating, it is more preferable to heat the monomer in advance before supplying it to the polymerization container, and it is especially preferable to use the heat of neutralization of the monomer for temperature rising. Note that the generation of the heat of neutralization and/or heat of hydration is effectively utilized not only for the temperature rising of the monomer aqueous solution but also for the removal of the dissolved oxygen. Further, it is also possible to improve the absorption rate, which is preferable.

In order to effectively utilize the heat of neutralization and/or the heat of hydration as above, it is preferable to carry out the neutralization in an adiabatic state, and it is more preferable to carry out the neutralization consecutively and also carry out the polymerization consecutively. Therefore, for example, it is desirable to use a container which can suppress heat radiation as much as possible. Regarding the material of the container, it is preferable to use, for example, a container configured such that a noncontact member made of resin, rubber or stainless steel is covered with a heat insulating material.

(Degassing)

In a preferable embodiment of the present invention, the amount of dissolved oxygen (oxygen concentration) with respect to the monomer aqueous solution is set to preferably 4 ppm or less, more preferably 2 ppm or less, and most preferably 1 ppm or less, and then the polymerization is carried out.

Regarding means for setting the above oxygen concentration, before putting the polymerization initiator, dissolved oxygen which disturbs the polymerization may be removed by blowing inactive gas or by degassing under reduced pressure. However, these require equipments and operating cost. According to a more preferable embodiment of the present invention, the removal of dissolved oxygen can be carried out by volatizing dissolved oxygen by increasing the temperature of the monomer aqueous solution by utilizing the heat of neutralization and/or the heat of hydration.

The amount of dissolved oxygen can be measured by, for example, a measuring device (UD-1 DO Meter produced by Central Kagaku Corporation). Note that when the temperature of the monomer aqueous solution exceeds 50° C., the measurement may not be carried out due to the heat resistance of the measuring device. The prepared monomer aqueous solution is iced while being moderately stirred under a nitrogen atmosphere so that bubbles are not formed. Then, the amount of dissolved oxygen is measured when the liquid temperature is 50° C.

Moreover, it is also preferable that (i) part or all of acrylic acid, alkali aqueous solution, water, etc. which are materials of the monomer aqueous solution be partially deoxidized in advance, and (ii) they are further deoxidized by the heat of neutralization. Moreover, when the polymerization is initiated at 80° C. or higher by carrying out line mixing neutralization of acrylic acid and alkali and further line mixing of the polymerization initiator, it is preferable that acrylic acid, alkali aqueous solution, water, etc. be hardly deoxidized or not oxidized at all so that the initiation of the polymerization in the line is prevented.

(Increase in Solid Content Concentration)

Moreover, in the method of the present invention, in order to obtain the water-absorbing resin whose absorption rate is high, the polymerization is carried out so that the solid content concentration increases.

According to a preferable example of the polymerization method of the present invention, after the initiation of the polymerization, the polymerization proceeds while (i) the temperature of the system increases rapidly and reaches the boiling point when the polymerization rate is low (for example, when the polymerization rate is 10 mole % to 20 mole % with respect to the whole monomers (100 mole %), (ii) vapor is produced, and (iii) the solid content concentration is increased. Thus, the solid content concentration is increased by effectively utilizing the heat of polymerization. The increase in the solid content concentration at the time of polymerization is preferably 1 weight % or more, more preferably 2 weight % or more, and further preferably 3 weight % or more.

Note that the increase in the solid content concentration is defined by a difference between the solid content concentration of the monomer aqueous solution and the solid content concentration of the obtained hydrated gel polymer. Regarding a method for measuring the increase in the solid content concentration, the solid content concentration is obtained as follows: (i) part of (small amount of) the hydrated polymer taken out of a polymerizer is cut off, (ii) the cut polymer is cooled down quickly, (iii) the cooled polymer is cut into pieces quickly with scissors, (iv) 5 g of the polymer is put in a dish, (v) it is dried in a drier of 180° C. for 24 hours. The solid content concentration of particulate hydrated polymer can be obtained as follows: (i) 5 g of a sample is put in a dish, (ii) the sample is dried in a drier of 180° C. for 24 hours, and (iii) the concentration is obtained from the loss on drying.

As one example of specific means for increasing the solid content concentration in the polymerization of the present invention, for example, in the case of the polymerization at normal pressures, the polymerization is preferably such that the temperature is already 100° C. or more when the polymerization rate is 40 mole %, and the temperature is 100° C. or more even when the polymerization rate is 50 mole %. The polymerization is more preferably such that the temperature is already 100° C. or more when the polymerization rate is 30 mole %, and the temperature is 100° C. or more even when the polymerization rate is 50 mole %. The polymerization is most preferably such that the temperature is already 100° C. or more when the polymerization rate is 20 mole %, and the temperature is 100° C. or more even when the polymerization rate is 50 mole %. In the case of the polymerization at reduced pressures, the polymerization is preferably such that the temperature is already a boiling temperature when the polymerization rate is 40 mole %, and the temperature is the boiling temperature even when the polymerization rate is 50 mole %. The polymerization is more preferably such that the temperature is already the boiling temperature when the polymerization rate is 30 mole %, and the temperature is the boiling temperature even when the polymerization rate is 50 mole %. The polymerization is most preferably such that the temperature is already the boiling temperature when the polymerization rate is 20 mole %, and the temperature is the boiling temperature even when the polymerization rate is 50 mole %.

(Drying)

If the polymer obtained by the above polymerization is a gel, the gel polymer is dried at preferably 70° C. to 250° C., further preferably 120° C. to 230° C., especially preferably 150° C. to 210° C., and most preferably 160° C. to 200° C., and if necessary, the dried polymer is pulverized. Thus, it is possible to obtain water-absorbing resin powder whose mass median particle diameter is about 10 µm to 1,000 µm. If the drying temperature is not in the above temperature range, a water-absorbing rate, a water-absorbing capacity, etc. may deteriorate. The drying method is not especially limited, and preferably used is a drying method (such as stir drying, fluidized bed drying, and flash drying) in which a material is moved to contact a hot air or a heating surface often.

Note that the above Document 11 (Tokukaihei 3-115313) does not disclose drying conditions. However, as is clear from the following Examples, the drying conditions also affect the physical properties.

When the hydrated gel polymer formed by the aqueous polymerization of the monomer component which becomes the water-absorbing resin by the polymerization is in such a shape (such as a thick plate, a block, or a sheet) that the polymer is hardly dried, the polymer is usually subjected to gel crushing so that its particle diameter becomes 10 mm or less, and preferably about 3 mm or less, and then the polymer is dried. In the gel crushing, about 0 to 30 mass %, preferably about 0 to 10 mass % (with respect to the water-absorbing resin) of water, a surfactant and a water-soluble polymer may be added to improve the gel crushing property. Thus, the physical properties may be improved.

Further, after the drying, respective steps, such as pulverizing, classification and surface treatment, are carried out if necessary. Thus, the water-absorbing resin is obtained. It is preferable in the present invention that the fine powder or coarse particles obtained in the classification step be applied to the polymerization as the solid.

(Surface Crosslinking)

In the manufacturing method of the present invention, a surface crosslinking treatment may be carried out with respect to the polymerized water-absorbing resin, especially with respect to the dried and pulverized water-absorbing resin. This improves the absorption capacity under load and the liquid permeability under load.

Used as a preferable surface crosslinking agent is one or two or more of an oxazoline compound (U.S. Pat. No. 6,297,319), a vinyl ether compound (U.S. Pat. No. 6,372,852), an epoxy compound (U.S. Pat. No. 625,488), an oxetane compound (U.S. Pat. No. 6,809,158), a polyhydric alcohol compound (U.S. Pat. No. 4,734,478), a polyamide polyamine-epihalo adduct (U.S. Patent Nos. 4,755,562 and 4,824,901), a hydroxy acrylamide compound (U.S. Pat. No. 6,239,230), an oxazolidinone compound (U.S. Pat. No. 6,559,239), a bis- or poly-oxazolidinone compound (U.S. Pat. No. 6,472,478), a 2-oxotetrahydro-1,3-oxazolidine compound (U.S. Pat. No. 6,657,015), an alkylene carbonate compound (U.S. Pat. No. 5,672,633), etc. Moreover, together with the surface crosslinking agent, it may be possible to use water-soluble cation (U.S. Pat. Nos. 6,605,673 and 6,620,899) such as aluminum salt, and also possible to use alkali (U.S. Patent Application Publication No. 2004-106745), an organic acid and an inorganic acid (U.S. Pat. No. 5,610,208), or the like. Moreover, the polymerization of the monomer on the surface of the water-absorbing resin may be carried out as the surface crosslinking (U.S. Patent Application Publication No. 2005-48221).

The crosslinking agents and crosslinking conditions used in the above patent documents are accordingly applicable to the present invention.

Preferably used as the surface crosslinking agent is a crosslinking agent which can react with an acid group, and examples of such a surface crosslinking agent are (i) a polyhydric alcohol compound, such as (poly)propylene glycol, (poly)ethylene glycol, (poly)glycerin, sorbitol (for example, see a pamphlet of International Publication No. 2005/44915), 1,3-propanediol, and 1,4-butanediol, (ii) a polyvalent epoxy compound, such as (poly)ethylene glycol diglycidyl ether, (iii) a polyvalent amine compound, such as (poly)ethyleneimine, (iv) various alkylene carbonate compounds, such as 1,3-dioxolane-2-one, 4-methyl-1,3-dioxolane-2-one, and 4,6-dimethyl-1,3-dioxane-2-one, and (v) a polyvalent metal salt, such as an aluminum salt. However, it is preferable to use at least polyhydric alcohol.

These surface crosslinking agents may be used alone or in combination of two or more. Note that the amount of the surface crosslinking agent to be used may be in a range from 0.001 weight % to 10 weight % with respect to the water-absorbing resin (100%), and more preferably in a range from 0.01 weight % to 5 weight %.

A method for adding the surface crosslinking agent is not especially limited, and examples are a method for dissolving the crosslinking agent in a hydrophilic solvent or in a hydrophobic solvent and mixing them, and a method for carrying out mixing without a solvent. Among the above, a mixture of the surface crosslinking agent and water as the hydrophilic solvent is preferable, or a mixture of the surface crosslinking agent and an organic solvent soluble in water is preferable. The amount of the hydrophilic solvent to be used or the amount of the mixture to be used depends on a combination of the water-absorbing resin and the crosslinking agent, but may be in a range from 0 weight % to 50 weight % with respect to the water-absorbing resin (100%), and preferably in a range from 0.5 weight % to 30 weight %. When mixing, the surface crosslinking agent or its solution may be dropped or sprayed.

In order to increase the crosslink density of the surface of the water-absorbing resin, heating is carried out after the surface crosslinking agent is added and mixed. The heating temperature may be selected accordingly in accordance with a desired crosslink density, etc., but is usually in a range from 100° C. to 250° C., and more preferably in a range from 150° C. to 250° C. Moreover, the heating time may be selected accordingly in accordance with the heating temperature, but is preferably in a range from about 1 minute to 2 hours.

(Particle Size)

In the present invention, it is preferable that the particle size of the water-absorbing resin be adjusted in a specific range by pulverizing or classification. Coarse particles (for example, particle diameter of 1 mm or more) and fine powder (for example, particle diameter of 150 μm or less) produced by the pulverizing or classification are used in the polymerization as the solid in the present invention. Thus, it is possible to carry out the particle size control more precisely. Further, it is possible to achieve the high absorption rate without reducing the particle size, unlike the conventional cases.

That is, it is easy to carry out the particle size control of the water-absorbing resin of the present invention. For example, the mass median particle diameter (D50) is controlled to be in a narrow range, that is, in a range preferably from 200 μm to 710 μm, more preferably from 250 μm to 600 μm, and especially preferably from 300 μm to 500 μm, and a ratio of particles of 850 μm or more or particles of less than 150 μm to the whole particles is from 0 mass % to 5 mass %, preferably 0 mass % to 3 mass %, more preferably 0 mass % to 2 mass %, and especially preferably 0 mass % to 1 mass %. The logarithm standard deviation ($\sigma\zeta$) of the particle size distribution is in a range preferably from 0.20 to 0.50, more preferably from 0.45 to 0.25, and especially preferably from 0.40 to 0.28. Note that the particle size is measured by a standard sieve classification (JIS Z8801-1 (2000) or equivalent) in accordance with U.S. Patent Application Publication No. 2005-118423.

Moreover, in the present invention, the bulk specific gravity (defined by JIS K-3362-1998) is controlled to be in a range preferably from 0.40 g/ml to 0.90 g/ml, and more preferably from 0.50 g/ml to 0.85 g/ml. Conventionally, the bulk specific gravity has been sacrificed to improve the absorption rate. However, the present invention can maintain the high bulk specific gravity. Therefore, it is possible to reduce the costs of the transportation and warehousing of the water-absorbing resin, and also possible to improve the impact resistance (Paint Shaker Test (described later)).

Note that the shape of the water-absorbing resin particle is an indeterminate pulverized shape since the water-absorbing resin is subjected to the pulverizing.

(Residual Monomer and Absorption Rate)

As one example of the effects, the present invention can improve the absorption rate in addition to the particle size control. The absorption rate depends on the particle size. However, when the particle size is in the above range, FSR (Free Swell Rate) is from 0.20 to 2.00 (g/g/sec), preferably from 0.25 to 1.00 (g/g/sec), further preferably from 0.27 to 0.90 (g/g/sec), and especially preferably from 0.30 to 0.80 (g/g/sec). If the FSR is less than 0.20, the absorption rate is too low, so that this may become a cause of leakage from a diaper. Moreover, if the FSR exceeds 2.00, liquid diffusion in a diaper may deteriorate.

As one example of the effects, the present invention can realize a reduction of the residual monomer in addition to the particle size control. Generally, in the foaming polymerization for improving the absorption rate, the residual monomer tends to increase. However, in the present invention, the residual monomer does not increase or tends to decrease even if the absorption rate improves. Therefore, the present invention is preferable.

The amount of residual monomer is from 0 ppm to 400 ppm, preferably from 0 ppm to 300 ppm, and further preferably from 0 ppm to 100 ppm.

(Other Physical Properties)

In the present invention, the physical properties are controlled by adjusting the crosslinking in accordance with purposes. In the case of hygienic goods, such as diapers, the physical properties are controlled as follows. Conventionally, the absorption capacity under load has been sacrificed to improve the absorption rate. However, in the present invention, the absorption capacity under load is high and preferable.

That is, the absorption capacity without load (CRC) of the water-absorbing resin of the present invention measured by using a 0.9 mass % physiological saline solution is usually 10 g/g or more, preferably 25 g/g or more, more preferably in a range from 30 g/g to 100 g/g, further preferably in a range from 33 g/g to 50 g/g, and especially preferably in a range from 34 g/g to 40 g/g.

The absorption capacity under load of 1.9 kPa (AAP1.9 kPa) measured by using the physiological saline solution is 20 g/g or more, more preferably in a range from 25 g/g to 40 g/g, and especially preferably in a range from 27 g/g to 35 g/g. Moreover, the absorption capacity under load of 4.9 kPa (AAP4.9 kPa) is 10 g/g or more, more preferably in a range from 22 g/g to 40 g/g, and especially preferably in a range from 24 g/g to 35 g/g.

A PPUP obtained by using the absorption capacity under load is from 40% to 100%, preferably from 50% to 100%, more preferably from 60% to 100%, and especially preferably from 70% to 100%. Note that the PPUP of the present invention is described in the pamphlet of International Publication No. 2006/109844, and is defined below.

The PPUP, that is, a liquid permeability efficiency under load of a particulate water-absorbing agent is obtained by the following formula using (i) the absorption capacity under load of 4.8 kPa measured for 60 minutes by using 0.9 g of the particulate water-absorbing agent and a 0.90 mass % sodium chloride aqueous solution (AAP: 0.90 g) and (ii) the absorption capacity under load of 4.8 kPa measured for 60 minutes by using 0.5 g of the particulate water-absorbing agent and the 0.90 mass % sodium chloride aqueous solution (AAP: 5.0 g).

PPUP (%)=(AAP: 5.0 g)/(AAP: 0.90 g)×100

As a liquid permeability, SFC (U.S. Patent Application Publication No. 2004-254553) is usually $1\times10^{-7}$ (cm$^3$×sec/g) or more, preferably $10\times10^{-7}$ (cm$^3$×sec/g) or more, and further preferably $50\times10^{-7}$ (cm$^3$×sec/g) or more.

A water content (defined by a loss in weight of 1 g of a resin after 3 hours at 180° C. in a windless oven) is preferably 90 mass % or more, further preferably in a range from 93 mass % to 99.9 mass %, and especially preferably in a range from 95 mass % to 99.8 mass %.

(Other Additives)

In addition to the above steps, the water-absorbing resin used in the present invention is supplied with an additive of 0 mass % to 10 mass %, and preferably about 0.001 weight % (10ppm) to 1 weight % (more preferably 50 ppm to 1 weight %) at the time of the polymerization or after the polymerization (for example, at the time of the surface crosslinking, the agglomerating, etc.). Preferably, a chelating agent may be added so that the physical properties are improved further.

In such a step, an additive or its solution (for example, an aqueous solution prepared by dissolving various additional components in water) can be added to the water-absorbing resin. Examples are (i) a water-insoluble fine particle, (ii) a chelating agent (see U.S. Pat. No. 6,599,989) (such as diethylenetriamine pentaacetate, triethylenetetraamine hexaacetic acid, cyclohexane-1,2-diamine tetraacetic acid, N-hydroxyethyl ethylenediamine triacetic acid, and ethylene glycol diethyl ether diamine tetraacetic acid), (iii) a plant component (such as tannin, tannic acid, gallnut, gall, and gallic acid), (iv) an inorganic salt (such as calcium, aluminum, magnesium, a polyvalent metal salt (zinc, etc.)), and (v) a reducing agent (see U.S. Pat. Nos. 4,972,019 and 4,863,989).

(Water-absorbing Resin of Present Invention)

That is, the present invention provides the water-absorbing resin whose repeating unit is acrylic acid (salt) of 70 mole % to 99.999 mole % and the crosslinking agent of 0.001 mole % to 5 mole % and which satisfies the following six conditions.

Absorption Capacity (CRC): 20 g/g to 40 g/g
Absorption Capacity Under Load (AAP): 20 g/g to 40 g/g
Absorption Rate (FSR): 0.25 g/g/sec to 1.0 g/g/sec
Bulk Specific Gravity (JIS K 3362): 0.50 to 0.80
Residual Monomer: 0 ppm to 400 ppm
Particles of 850 μm to 150 μm in Particle Size Distribution (JIS Z8801-1): 95 weight % to 100 weight %

Note that the above "water-absorbing resin whose repeating unit is acrylic acid (salt) of 70 mole % to 99.999 mole % and the crosslinking agent of 0.001 mole % to 5 mole %" is the water-absorbing resin which has, as the repeating unit, such a structure that one molecule of the crosslinking agent binds 14 to 99,999.9 molecules of acrylic acid (salt).

The above water-absorbing resin can be manufactured, for example, by the method for manufacturing the water-absorbing resin of the present invention, that is, by carrying out the stationary polymerization in the presence of water-insoluble solid matters and adjusting the initiation temperature of the polymerization to 40° C. or more or adjusting the maximum temperature of the polymerization to 100° C. or more.

Based on the weight of the acid-group containing unsaturated monomer at the time of the polymerization, the water-absorbing resin preferably contains 0.1 weight % to 50 weight % of the water-insoluble particle (preferably, the water-absorbing resin powder).

Preferable ranges of the above six physical properties, such as the absorption capacity, and a preferable range of the content of the water-absorbing resin powder are described herein. In the present invention, since the water-absorbing resin contains a specific amount of the water-insoluble particles (preferably, the water-absorbing resin powder), it is possible to improve the absorption rate, reduce the residual monomer, carry out the particle size control, improve the absorption capacity under load, and control the bulk specific gravity, which have generally been difficult to be realized in the past.

Especially, a conventional water-absorbing resin having the high water-absorbing rate has a fatal disadvantage that since the foaming and/or the agglomerating is required, the impact resistance of the powder of this resin becomes low and/or the bulk specific gravity of the powder of this resin becomes low (that is, the powder of this resin becomes bulky.). As compared with the water-absorbing resin described in U.S. Pat. Nos. 6,071,976, 6,414,214, 5,837,789, 6,562,879, etc. disclosing the water-absorbing resin which suppress deterioration, caused by impact, of its absorption capacity under pressure (AAP) and its liquid permeability (SFC), the water-absorbing resin of the present invention is dramatically improved in the water-absorbing rate (FSR), etc. Therefore, it is possible to provide a new water-absorbing resin which can be preferably used in diapers practically, and excels in the impact resistance and the water-absorbing rate.

Then, it is possible to obtain the water-absorbing resin which can maintain high absorption performance even when used in the diaper. That is, it is also possible to obtain a new water-absorbing resin whose absorption rate is high even in the diaper, the amount of residual monomer of which is small, and which does not cause, regardless of the presence or absence of the water-insoluble particle, transportation cost rise caused due to the deterioration of the bulk specific gravity.

(Application)

The water-absorbing resin of the present invention absorbs not only water but also various liquids, such as body fluid, physiological saline solution, urine, blood, cement water, and fertilizer-containing water, and is preferably used in hygienic goods, such as disposable diapers, sanitary napkins and incontinent pads, and also in various industrial fields, such as civil engineering, agriculture and horticulture.

(Inference Regarding Mechanism of Present Invention)

Details of a reason why the absorption rate improves by the present invention are unclear. However, its mechanism is inferred as follows. Note that this mechanism does not limit the right of the present invention.

As above, an inference of the manufacturing method of the present invention is that (i) a compound which is insoluble or hardly soluble in a monomer aqueous solution is dispersed in a monomer aqueous solution, (ii) by carrying out the polymerization (preferably, the foaming polymerization) which is initiated at 40° C. or more, the added compound functions as a boiling stone and significantly accelerates the foaming, and (iv) as a result, many bubbles are formed in the hydrophilic polymer (for example, in the water-absorbing resin).

Moreover, since the monomer is polymerized while the foaming is being carried out significantly, the surface area of the gel becomes large. Because of this, the water evaporation is carried out effectively, and at the same time, so-called a heat removal effect can be obtained. Therefore, it is possible to manufacture the water-absorbing resin having an excellent performance. Further, an inference is that the evaporation of nonpolymerized monomer component and the water evaporation are carried out significantly, the amount of residual monomer in the polymer reduces, the solid content in the polymer increases, and the heat removal efficiency improves.

As compared to a conventional high-temperature initiated polymerization (no addition of a compound which is insoluble or hardly soluble but is dispersible in an aqueous solution containing a hydrophilic monomer, and which is solid at normal temperature), the added compound of the method of the present invention can significantly accelerate the foaming during the polymerization (the frequency of the foaming increase). Moreover, in the polymerization of the present invention, steam is generated (foaming is carried out) at boiling point, and this forms bubbles (holes) in the hydrophilic polymer. However, most of the bubbles shrink at the end of the polymerization. That is, the shape of this hydrophilic polymer (for example, the water-absorbing resin) is substantially the same as that of the polymer containing no bubbles, but this hydrophilic polymer contains many potential bubbles. The potential bubbles become the holes again when the hydrophilic polymer (for example, the water-absorbing resin) is immersed in a solvent, such as water, and swells.

According to the method of the present invention, it is possible to manufacture the water-absorbing resin containing many potential bubbles (holes) described above. Therefore, the absorption rate significantly improves since the bubbles (holes) increase the surface area of the water-absorbing resin when the water-absorbing resin swells.

EXAMPLES

The following will explain the present invention in more detail on the basis of Examples, however the present invention is not limited to these. Note that in the following explanation, "mass part" may be simply termed "part", and "liter" may be simply termed "L" for convenience. Moreover, "mass %" may be termed "wt %". Further, the water-absorbing resin is used (handled) under conditions of a temperature of 25° C. ±2° C. and a relative humidity of about 50% RH ±5% RH. Moreover, a 0.90 mass % sodium chloride aqueous solution is used as a physiological saline solution.

Note that in the case of analyzing a commercial product, such as the water-absorbing resin in a diaper, which is wet, the water-absorbing resin may be accordingly dried under reduced pressure so that the water content thereof is adjusted to about 5%. Then, the measurement is carried out.

<Absorption Capacity (CRC)>

0.2 g of the water-absorbing resin was uniformly put into a bag (85 mm×60 mm) made of nonwoven fabric (produced by Nangoku Pulp Kogyo Co., Ltd., Product Name: Heatron Paper, Type: GSP-22), and the bag was heat sealed and immersed in a large excess (usually about 500 ml) of the physiological saline solution whose temperature was adjusted to be from 20° C. to 25° C. The bag was pulled out of the solution 30 minutes later, was drained off using a centrifuge (produced by Kokusan Co., Ltd., Centrifuge: Type H-122) by centrifugal force (250G) described in "edana ABSORBENCY II 441.1-99" for 3 minutes. Then, a weight W1 (g) of the bag was measured. Moreover, the same operation was carried out without the water-absorbing resin. Then, a weight W2 (g) of the bag was measured. Then, the absorption capacity (g/g) was calculated by the following formula using W1 and W2.

Absorption Capacity (g/g)=($W1$ (g)−$W2$ (g))/(Weight (g) of Water-absorbing Resin)−1

<Absorption Rate (FSR, Free Swell Rate)>

1.00 g of the water-absorbing resin was put into a 25 ml glass beaker (a diameter of 32 mm to 34 mm and a height of 50 mm). Here, the upper surface of the water-absorbing resin in the beaker was flattened (the surface of the water-absorbing resin may be flattened by, for example, carefully tapping the beaker according to need). Next, 20 g of the physiological saline solution whose temperature was adjusted to be 23° C. ±2° C. was put into a 50 ml glass beaker. Then, the total weight (unit: g) of the physiological saline solution and the glass beaker was measured (W3). This physiological saline solution was carefully and quickly put into the 25 ml beaker storing the water-absorbing resin. Time measurement was started when the physiological saline solution contacted the water-absorbing resin. Then, in the case of viewing, at an angle of about 20° C., the surface of the physiological saline solution in the beaker, when the upper surface which was first the surface of the physiological saline solution became the surface of the water-absorbing resin which absorbed the physiological saline solution, the time measurement was terminated (unit: second) (tS). Next, the weight (unit: g) of the 50 ml glass beaker was measured after the physiological saline solution was poured from the 50 ml glass beaker to the 25 ml beaker (W4). The weight (W5, unit: g) of the physiological saline solution was obtained by Formula (a) below.

The absorption rate (FSR) was calculated by Formula (c) below.

$W5$ (g)=$W3$ (g)−$W4$ (g)  Formula (a):

FSR (g/g/s)=$W5$/($t_s$×Weight of Water-absorbing Resin (g))  Formula (c):

<Absorption Capacity Under Load (AAP)>

An apparatus shown in FIG. 1 was used. A stainless steel 400 mesh metal screen 101 (mesh size: 38 μm) was fusionbonded to the bottom of a plastic supporting cylinder 100 having an internal diameter of 60 mm, and 0.900 g of a water-absorbing resin 102 (its major component (especially, 99 weight % or more) is a particle whose particle diameter is 38 µm or more) was evenly spread on the metal screen 101. Then, a piston 103 and a load 104 were placed in this order on the water-absorbing resin 102. The piston 103 and the load 104 were adjusted so as to apply load of 4.83 kPa (0.7 psi) uniformly to the water-absorbing resin. Each of the piston 103 and the load 104 has an external diameter which is slightly smaller than 60 mm so that (i) there was no gap between the piston 103 (the load 104) and the supporting cylinder 100 and (ii) the vertical motions of the piston 103 (the load 104) were smooth. A weight W6 (g) of this complete set of measuring device was measured.

A glass filter 106 (produced by Sogo Rikagaku Glass Works Co., Ltd., Pore Diameter: 100 µm to 120 µm) having a diameter of 90 mm was placed inside a petri dish 105 having a diameter of 150 mm, and a physiological saline solution 108 (20° C. to 25° C.) was added to the petri dish 105 so that the liquid level of the physiological saline solution 108 was the same as the top surface of the glass filter 106. Then, a piece of filter paper 107 (produced by Advantec Toyo Co., Ltd., Product Name: (JIS P 3801, No. 2), Thickness: 0.26 mm, Retained Particle Diameter: 5 µm) having a diameter of 90 mm was placed on the glass filter 106 so that the surface of the filter paper 107 got wet entirely, and excessive liquid was removed.

The complete set of measuring device was placed on the wet filter paper, and the liquid was absorbed under load. The complete set of measuring device was lifted up an hour later, and a weight W7 (g) of the complete set of measuring device was measured. Then, the absorption capacity under load (g/g) was calculated by the following formula using W6 and W7.

Absorption Capacity Under Load=(W7 (g)−W6 (g))/ (Weight of Water-absorbing Resin (g))

<Extractable Polymer (Content)>

184.3 g of the physiological saline solution was measured and poured in a lidded plastic container having a capacity of 250 ml, 1.00 g of the water-absorbing resin was added to this solution, and this mixture was stirred for 16 hours. Thus, the extractable polymer in the resin was extracted. This extraction liquid was filtered by a piece of filter paper (produced by Advantec Toyo Co., Ltd., Product Name: (JIS P 3801, No. 2), Thickness: 0.26 mm, Retained Particle Diameter: 5 µm), so that filtrate was obtained. 50.0 g of this filtrate was prepared as a measurement solution.

First, only the physiological saline solution was titrated with a 0.1N NaOH aqueous solution to pH10, and then was titrated with a 0.1N HCl aqueous solution to pH2.7. Thus, blank titer ([bNaOH] ml, [b HCl] ml) was obtained. Similar titration was carried out with respect to the measurement solution. Thus, titer ([NaOH] ml, [HCl] ml) was obtained. For example, in the case of the water-absorbing resin containing known amount of acrylic acid and its salt, the extractable polymer content (major component is an extracted water-soluble polymer) in the water-absorbing resin can be calculated by Formula (2) below using the average molecular weight of the monomer and the titer obtained by the above-described titration.

Extractable Polymer (mass %)=0.1×(Average Molecular Weight)×184.3×100×([HCl]−[bHCl])/1, 000/1.0/50.0  (2)

Moreover, when the amount of acrylic acid and its salt was unknown, the average molecular weight of the monomer was calculated using a neutralization ratio (Formula (3) below) obtained by the titration.

Neutralization Ratio (mole %)=(1−([NaOH]− [bNaOH])/([HCl]−[bHCl]))×100  (3)

<Amount of Residual Monomer (ppm)>

1.00 g of the water-absorbing resin was dispersed in 184.3 g of the physiological saline solution, and was stirred by a magnetic stirrer having a length of 25 mm for 16 hours. Thus, the residual monomers were extracted. Then, the swollen gel was filtered by a piece of filter paper (produced by Toyo Roshi Kaisha, Ltd., No. 2, Retained Particle Diameter defined by JIS P 3801: 5 µm), and this filtrate was further filtered by a HPLC sample pretreatment filter chromato disk 25A (produced by Kurabo Industries, Ltd., Water type, Pore Size: 0.45 µm). Thus, a residual monomer measurement sample was obtained.

The residual monomer measurement sample was analyzed by a high-performance liquid chromatography (HPLC). In consideration of (i) an external standard that is a calibration curve obtained by analyzing a monomer standard solution having a known concentration and (ii) the dilution degree of the water-absorbing resin particles or the particulate water-absorbing agent with respect to the deionized water, the amount of residual monomers of the water-absorbing resin particles or the particulate water-absorbing agent was quantitated. Measurement conditions of the HPLC were as follows.

Carrier liquid: Phosphoric acid aqueous solution prepared by diluting 3 ml of phosphoric acid (85 mass %, produced by Wako Pure Chemical Industries, Ltd., Special Grade Chemical) with 1,000 ml of super pure water (Specific Resistance: 15 MΩ·cm or more)

Carrier speed: 0.7 ml/min.

Column: SHODEX RSpak DM-614 (produced by Showa Denko K. K.)

Column temperature: 23° C. ±2° C.

Wavelength: UV205 nm

<Bulk Specific Gravity, Falling Rate>

Using a bulk specific gravity measuring device (produced by Kuramochi Kagaku Kiki Seisakusho), measurement was carried out in accordance with JIS K 3362. After having put, in a funnel whose damper is closed, 100.0 g of the water-absorbing resin which was mixed adequately so that imbalance due to the particle sizes was eliminated, the damper was opened quickly, and the water-absorbing resin dropped in a receiver whose capacity was 100 ml. A time (second) from when the water-absorbing resin starts dropping until when the dropping finishes is a falling rate. The water-absorbing resin protruding from the receiver was removed by a glass rod, and then the weight of the receiver storing the water-absorbing resin was measured accurately to the unit of 0.1 g. The bulk specific gravity was calculated by the following formula.

Bulk Specific Gravity (g/ml)=(Weight (g) of Receiver Containing Water-absorbing Resin−Weight (g) of Receiver)/Capacity (100 ml) of Receiver Note that this measurement was carried out at a temperature of 25° C. ±2° C. and a relative humidity of 30% RH to 50% RH.

<Mass Median Particle Diameter (D50) And Logarithm Standard Deviation ((σζ)>

The water-absorbing resin was sieved by JIS standard sieves having mesh size of 850 µm, 710 µm, 600 µm, 500 µm, 425 µm, 300 µm, 212 µm, 150 µm, 106 µm, 75 µm and 45 µm, and a residual percentage was plotted logarithmically. Note that a sieve(s) may be added according to need depending on the particle diameter of the water-absorbing resin. Thus, a particle diameter corresponding to R=50 mass % was considered as the mass median particle diameter (D50). Moreover, the logarithm standard deviation (σζ) of the particle size distribution is shown by the following formula. The smaller the value of σζ is, the narrower the particle size distribution is.

$$\sigma\zeta = 0.5 \times \ln 1(X2/X1)$$

(where X1 denotes the particle diameter when R=84.1%, and X2 denotes the particle diameter when R=15.9%)

10.0 g of the water-absorbing resin was put into the JIS standard sieve (The IIDA TESTING SIEVE, Internal Diameter: 80 mm) having the mesh size of 850 μm, 710 μm, 600 μm, 500 μm, 425 μm, 300 μm, 212 μm, 150 μm, 106 μm, 75 μm, 45 μm or the like, and classified with a Low Tap Sieve Shaker (ES-65 Sieve Shaker produced by Iida Seisakusho) for 5 minutes.

Note that the mass median particle diameter (D50) of particles corresponds to a certain mesh size of a standard sieve on which 50 mass % of the particles remain, as disclosed in U.S. Pat. No. 5,051,259, etc.

<Solid Content>

1.00 g of the water-absorbing resin was put in an aluminum cup whose bottom surface has a diameter of about 50 mm, and a total weight W8 (g) of the water-absorbing resin and the aluminum cup was measured. Then, the aluminum cup was placed in an oven of ambient temperature of 180° C. for 3 hours, so as to be dried. 3 hours later, the water-absorbing resin and the aluminum cup were taken out of the oven, and those were sufficiently cooled down to room temperature in a desiccator. After that, a total weight W9 (g) of the dried water-absorbing resin and the aluminum cup was measured. The solid content was calculated by the following formula.

Solid Content (mass %)=100−((W8−W9)/(Weight of Water-absorbing Resin (g))×100)

<Impact Resistance Test (Another Name; Paint Shaker Test)>

A paint shaker test is that (i) 10 g of glass beads each having a diameter of 6 mm and 30 g of the water-absorbing resin are put in a glass container having a diameter of 6 cm and a height of 11 cm, and (ii) the glass container is attached to a paint shaker (produced by Toyo Seiki Seisakusho, Product No. 488), and (iii) the paint shaker shakes the glass container at 800 cycle/min (CPM). Details of this apparatus is disclosed in U.S. Pat. No. 6,071,976 (Corresponding Japanese Patent Laid Open Publication: Tokukaihei 9-235378). Note that a shaking time was 30 minutes.

After shaking the glass container, the glass beads were removed by using the JIS standard sieve having a mesh size of 2 mm. Thus, the damaged water-absorbing resin was obtained.

Reference Example 1

In a reactor including a lid and a jacketed stainless steel twin-arm kneader having two sigma blades and a capacity of 10 L, 530.2 g of acrylic acid, 4364.2 g of a 37 mass % sodium acrylate aqueous solution, 553.7 g of pure water, and 7.7 g of polyethylene glycol diacrylate (molecular weight 523) were dissolved. Thus, reaction liquid was prepared.

Next, this reaction liquid was degassed for 20 minutes with nitrogen. gas while being adjusted to 25° C. Then, 19.6 g of a 15 mass % sodium persulfate aqueous solution and 24.5 g of a 0.1 mass % L-ascorbic acid aqueous solution were added to the reaction liquid while stirring. About one minute later, polymerization started. Here, the initiation temperature of the polymerization was 25.2° C.

Then, the polymerization was carried out at 25° C. to 95° C. while the produced gel was being crushed. Hydrated gel crosslinked polymer was taken out 30 minutes after the polymerization started. The obtained hydrated gel crosslinked polymer was fragmented so that the diameter of each fragmented piece was about 5 mm or less.

These fragmented pieces of the hydrated gel crosslinked polymer were spread out on a stainless steel metal screen having a mesh size of 850 μm, and were dried by hot air of 180° C. for 40 minutes. The dried pieces were pulverized with a roll mill (WML Crushing Roller, produced by Inoguchi Giken, Ltd.), and the pulverized pieces were further classified by the JIS standard sieve having the mesh size of 150 μm. Thus, obtained was a water-absorbing resin (A) having the particle size of 150 μm or less and an indeterminate pulverized shape. The absorption capacity of the water-absorbing resin (A) was 35.3 g/g, and the extractable polymer content of the water-absorbing resin (A) was 16.5 mass %.

Example 1

(Polymerization)

A solution (A) was prepared by mixing, in a 1 L polypropylene resin container, (i) 293.1 g of acrylic acid, (ii) 1.1 g of polyethylene glycol diacrylate (average molecular weight 522) as the internal crosslinking agent, (iii) 1.8 g of a 1 mass % diethylenetriamine pentaacetic acid pentasodium aqueous solution as the chelating agent, and (iv) 3.6 g of a 1.0 mass % acrylic acid solution of IRGACURE (Trademark) 184 as the polymerization initiator. Moreover, a solution (B) was prepared by mixing (i) 237.65 g of a 48.5 mass % sodium hydroxide aqueous solution and (ii) 251.82 g of ion exchanged water whose temperature was adjusted to 50° C. 54 g of the water-absorbing resin (A) obtained in Reference Example 1 was added to the solution (A) which was being stirred at 500 r.p.m. using a magnetic stirrer chip having a length of 50 mm, and then the solution (B) was quickly added and mixed. Thus, a monomer aqueous solution (C) was obtained. The temperature of the monomer aqueous solution (C) was increased to 102° C. due to the heat of neutralization and the heat of dissolution.

Next, when the temperature of the monomer aqueous solution (C) was decreased to 97° C., 11 g of a 3 mass % sodium persulfate aqueous solution was added to the monomer aqueous solution (C). This mixture was stirred for about one second, and then was poured in an open system into a stainless steel tray-type container (i) whose surface temperature was increased by a hotplate (NEO HOTPLATE H1-1000, produced by Iuchi Seiei Do K. K.) which was set to 130° C. and (ii) to an inner surface of which Teflon (Trademark) was attached, and (iii) whose bottom surface was 250 mm×250 mm. The stainless steel tray-type container had the bottom surface of 250 mm×250 mm, an upper surface of 640 mm×640 mm and a height of 50 mm. A central cross section of the stainless steel tray-type container was a trapezoid, and the upper surface was open. Moreover, the monomer aqueous solution was poured into the stainless steel tray-type container, and at the same time, an ultraviolet irradiation device (Toscure 401, Type: HC-04131-B, Lamp: H400L/2, produced by Harison Toshiba Lighting Corp.) provided at a position 600 mm above the bottom surface of the stainless steel tray-type container irradiates ultraviolet.

The polymerization started shortly after the monomer aqueous solution was poured into the tray, and the stationary aqueous polymerization proceeded while generating vapor (initiation temperature: 97° C.). The temperature of the polymerization reached the peak temperature (peak temperature: 106° C.) within about 1 minute. 3 minutes later, the irradiation of the ultraviolet stopped, and the hydrated polymer (hydrated gel) was taken out. Note that a series of these operations were carried out in a system open to the air.

(Gel Fragmentation)

The hydrated gel crosslinked polymer thus taken out was cut with scissors so as to be in the shape of a strip having a width of 30 mm. Then, while adding the ion exchanged water at a rate of 1.4 g/sec and the hydrated gel crosslinked polymer at a rate of about 6 g/sec, the hydrated gel crosslinked polymer was crushed by a meat chopper (MEAT-CHOPPER, TYPE: 12VR-400KSOX, produced by Iizuka Kogyo Co., Ltd., Die Pore Diameter: 9.5 mm, Number Of Pores: 18, Die Thickness: 8 mm). Thus, the fragmented hydrated gel crosslinked polymer was obtained.

(Drying, Crushing and Classification)

The fragmented crushed gel particles were spread out on a metal screen having the mesh size of 850 µm, and were dried by hot air of 180° C. for 40 minutes. The dried particles were pulverized with a roll mill (WML Crushing Roller, produced by Inoguchi Giken, Ltd.), and the pulverized particles were classified by the JIS standard sieve having the mesh size of 850 µm. Thus, obtained was a water-absorbing resin (i) whose D50 was 461 µm, (ii) whose percentage of particles each having the particle diameter of 600 µm or more but less than 850 µm was 28 mass %, (iii) whose percentage of particles each having the particle diameter of less than 150 µm was 2.2 mass %, (iv) whose logarithm standard deviation (σζ) was 0.364, (v) whose solid content was 96 mass %, and (vi) whose shape was an indeterminate pulverized shape.

(Surface Crosslinking)

100 parts by weight of the obtained water-absorbing resin was uniformly mixed with a surface treatment agent solution that is a mixture of 0.3 parts by weight of 1,4-butanediol, 0.5 parts by weight of propylene glycol, and 2.7 parts by weight of pure water. The water-absorbing resin having mixed with the surface crosslinking agent solution was subjected to a heat treatment by a jacketed heating device with a stirring blade (Jacket Temperature: 210° C.) for an arbitrary period of time. After the heat treatment, the obtained water-absorbing resin was caused to pass through the JIS standard sieve having the mesh size of 850 µm. Thus, a particulate surface-crosslinked water-absorbing resin (1) was obtained. Physical properties of the particulate water-absorbing resin (1) were shown in Table 1. Moreover, the percentage of the particulate water-absorbing resin which was subjected to the paint shaker test and then caused to pass through the JIS standard sieve having the mesh size of 150 µm was 6.2 mass % with respect to the whole particles.

Example 2

In the present Example, a particulate water-absorbing resin (2) was obtained in the same manner as Example 1 except that the amount of polyethylene glycol diacrylate (average molecular-weight 522) was 0.75 g and the amount of the water-absorbing resin (A) obtained in Reference Example 1 was 72 g. Physical properties of the particulate water-absorbing resin (2) were shown in Table 1.

Example 3

In the present Example, a particulate water-absorbing resin (3) was obtained in the same manner as Example 1 except that 18 g of synthetic zeolite (produced by Tosoh Corporation, Zeorum A-4, 100-mesh Passed Powder) was used instead of the water-absorbing resin (A). Physical properties of the particulate water-absorbing resin (3) were shown in Table 1.

Example 4

(Polymerization)

A solution (D) was prepared by mixing (i) 202.7 g of acrylic acid, (ii) 1776.5 g of a 37 mass % sodium acrylate aqueous solution, and (iii) 3.8 g of polyethylene glycol diacrylate (average molecular weight 522) as the internal crosslinking agent. Then, the solution (D) was deoxidized by blowing nitrogen gas at a flow rate of 2 L per minutes for 30 minutes while adjusting the temperature of the solution (D) to 15° C. The deoxidized solution (D) was poured into a stainless steel container which was 300 mm×220 mm×60 mm (depth) and Teflon (Trademark) coated, and an upper opening of the container was covered with a polyethylene film. By continuously blowing nitrogen gas at a flow rate of 2 L/m into the container, a nitrogen gas atmosphere in the container was maintained so that the solution (D) was not exposed to oxygen. Next, 7.8 g of a 15 mass % sodium persulfate aqueous solution and 9.1 g of a 2 mass % L-ascorbic acid aqueous solution were added as the polymerization initiator, and this mixture was stirred using a magnetic stirrer chip having a length of 50 mm at 300 r.p.m., and mixed uniformly. Then, 129 g of the water-absorbing resin (A) obtained in Reference Example 1 was added. The initiation of the polymerization (opaqueness) was confirmed 2.4 minutes after the addition of the initiator, and 10 mm of the stainless steel container was immersed in a water bath whose temperature was adjusted to 10° C. Note that the temperature of the solution at the time of the initiation of the polymerization was 16° C. The temperature of the polymerization reached its peak 5.9 minutes after the addition of the initiator. The peak temperature was 103° C. 12 minutes after the addition of the initiator (6.1 minutes after the polymerization peak), the stainless steel container was moved to a water bath whose temperature was 80° C., and 10 mm of the stainless steel container was immersed in this water bath as before (as with the above case of immersing in the water bath whose temperature was 10° C.). The stainless steel container was taken out of the water bath 12 minutes after it was immersed in the water bath of 80° C., and the hydrated polymer (hydrated gel) was taken out of the stainless steel container.

The gel fragmentation, drying, pulverizing and classification were carried out in the same manner as Example 1. Thus, obtained was a water-absorbing resin (i) whose D50 was 434 µm, (ii) whose percentage of particles each having the particle diameter of 600 µm or more but less than 850 µm was 24 mass %, (iii) whose percentage of particles each having the particle diameter of less than 150 µm was 3.6 mass %, (iv) whose solid content was 95 mass %, and (v) whose shape was an indeterminate pulverized shape.

The surface crosslinking was carried out in the same manner as Example 1. Thus, a particulate water-absorbing resin (4) was obtained. Physical properties of the particulate water-absorbing resin (4) were shown in Table 1.

Comparative Example 1

In the present Comparative Example, a comparative particulate water-absorbing resin (1) was obtained in the same manner as Example 1 except that the water-absorbing resin (A) was not added. Physical properties of the comparative particulate water-absorbing resin (1) were shown in Table 1.

Comparative Example 2

In the present Comparative Example, a comparative particulate water-absorbing resin (2) was obtained in the same manner as Reference Example 1 except that 321 g of the water-absorbing resin (A) obtained in Reference Example 1 was added to the degassed reaction liquid in Reference Example 1. Physical properties of the comparative particulate water-absorbing resin (2) were shown in Table 1.

Comparative Example 3

In the present Comparative Example, the foaming polymerization was carried out as a conventional method for improving the absorption rate, in reference to U.S. Pat. No. 61,807,358 (Tokukaihei 10-251310, Example 2).

A monomer aqueous solution was prepared by mixing (i) 360 g of acrylic acid, (ii) 3,240 g of a 37 mass % sodium acrylate aqueous solution, (iii) 8.8 g of polyethylene glycol diacrylate (average molecular weight 522), (iv) 0.3 g of polyoxyethylene sorbitan monostearate (Product Name: Rheodol TW-S120, produced by Kao Corporation), (v) 1420 g of ion exchanged water, and (vi) 10 g of a 10 mass % sodium persulfate aqueous solution.

Using Whip Auto Z produced by Aikosha Co., Ltd., bubbles of nitrogen gas were dispersed in the aqueous solution. The solution was put in a container, and 10 g of a 10 mass % sodium bisulfite aqueous solution was added immediately. Then, the polymerization was initiated immediately. The initiation temperature of the polymerization was 26.2° C. Then, the stationary aqueous polymerization was carried out in the container for one hour. Thus, obtained was a sponge-like hydrated gel crosslinked polymer containing many bubbles (peak temperature: 98° C.). The hydrated gel crosslinked polymer was cut so as to be in the shape of a block of 10 mm to 30 mm in size. The blocks were spread out on a 20 mesh metal screen, and the following operations were carried out in the same manner as Example 1. Thus, a comparative particulate water-absorbing resin (3) was obtained. Physical properties of the comparative particulate water-absorbing resin (3) were shown in Table 1.

Comparative Example 4

Comparative Example 4 was the same as Example 1 except that the stirring polymerization, that is, a continuous kneader polymerization used in U.S. Patent Application Publication No. 2004-110897 was carried out. As a polymerization container having two-axis stirring blades, a continuous kneader (produced by Dalton Co., Ltd., CKDJS-40) used in Example(s) of the above U.S. Patent was used to carry out the continuous polymerization. Then, the drying, pulverizing, and surface crosslinking were carried out in the same manner as Example 1. However, the absorption rate did not improve. Therefore, it is not preferable to carry out the stirring polymerization disclosed in U.S. Patent Application Publication No. 2004-110897, U.S. Pat. Nos. 670,141, 4,625,001, 5,250,640, etc.

Comparative Example 5

Comparative Example 5 is the same as Example 1 except that, as with Example 1 of Tokukaihei 3-115313, (i) a sodium acrylate slurry whose monomer aqueous solution (slurry) concentration was 56% and neutralization ratio was 75 mole % was prepared, (ii) this monomer slurry (monomer aqueous dispersion) was cooled down to 35° C., (iii) sodium persulfate was added as the initiator to the slurry, and (iv) this slurry was made into a layer having a thickness of 15 mm. Thus, the polymerization was carried out.

As with Example 1 of Tokukaihei 3-115313, the slurry gelated (peak temperature: 105° C.) in about 20 minutes. Further, the bottom of the polymerization container was heated to 100° C. 15 minutes later, the hydrated polymer was taken out of the polymerization container. The peak temperature was 171° C. Moreover, for comparison with Example 1 of the present application, the number of moles of the polymerization initiator and the number of moles of the crosslinking agent were the same as those of Example 1 of the present application.

As with Example 1, the gel fragmentation, drying, pulverizing and classification were carried out with respect to the obtained hydrated polymer. Thus, a comparative particulate water-absorbing resin (5) was obtained. Physical properties of the comparative particulate water-absorbing resin (5) were shown in Table 1.

Comparative Example 6

Comparative Example 6 was the same as Example 1 except that (i) prepared in accordance with Example 2 of Tokukaihei 3-115313 was a sodium acrylate slurry which contained 1 weight % (with respect to the solid content of the monomer) of fine-particle silica (Product Name: Aerosil, Average Particle Diameter: 0.02 μm), whose sodium acrylate was 57 weight %, and whose neutralization ratio was 73 mole %, and (ii) the polymerization was carried out in the same manner as Comparative Example 5. Note that the peak temperature of the polymerization was 168° C.

As with Example 1 of the present application, the gel fragmentation, drying, pulverizing and classification were carried out with respect to the obtained hydrated polymer. Thus, a comparative particulate water-absorbing resin (6) was obtained. Physical properties of the comparative particulate water-absorbing resin (6) were shown in Table 1.

Comparative Example 7

A comparative particulate water-absorbing resin (7) was obtained in the same manner as Example 4 except that the water-absorbing resin (A) was not added. Physical properties of the comparative particulate water-absorbing resin (7) are shown in Table 1.

Comparative Example 8

A fragmented hydrated gel crosslinked polymer was obtained in the same manner as Reference Example 1 except that the amount of the pure water is changed from 553.7 g to 504.6 g, and 49.1 g of a 10 mass % 2,2'-azobis (2-amidinopropane) dihydrochloride (V-50, produced by Wako Pure Chemical Industries, Ltd.) aqueous solution was added simultaneously with the 15 mass % sodium persulfate aqueous solution and the 0.1 mass % L-ascorbic acid aqueous solution.

Then, the obtained fragmented hydrated gel crosslinked polymer was dried, pulverized, classified and surface-crosslinked in the same manner as Example 1. Thus, a comparative particulate water-absorbing resin (8) was obtained. Physical properties of the comparative particulate water-absorbing resin (8) are shown in Table 1.

Comparative Example 9

A comparative particulate water-absorbing resin (9) was obtained in accordance with EXAMPLE 1 in U.S. Pat. No. 6,562,879.

Specifically, in a reactor including a lid and a jacketed stainless steel twin-arm kneader having two sigma blades and a capacity of 10 L, 2.4 g of ammonium persulfate and 0.12 g of L-ascorbic acid were added, while stirring, to reaction liquid prepared by dissolving 2.50 g of polyethylene glycol diacrylate in 5,500 g of an aqueous solution of sodium acrylate having a neutralization ratio of 75 mole % (monomer concentration: 33 weight %). About one minute later, polymerization started. Then, the polymerization was carried out at 30° C. to 80° C. while the produced gel was being crushed. Hydrated gel crosslinked polymer was taken out 60 minutes after the polymerization started.

The obtained hydrated gel crosslinked polymer was fragmented so that the diameter of each fragmented piece was about 5 mm or less. These fragmented pieces of the hydrated gel crosslinked polymer were spread out on a metal screen of 50 mesh (mesh size 300 µm), and were dried by hot air of 150° C. for 90 minutes. Thus, obtained was a water-absorbing resin that is a crosslinked polymer.

The water-absorbing resin was pulverized with a hammer mill (rooster, diameter of opening=3 mm), and 150 g of the pulverized water-absorbing resin was placed into a homogenizer (high-speed homogenizer, Model: MX-7, produced by Nihonseiki Kaisha Ltd.) and then ground at 6,000 rpm for about one hour. The obtained water-absorbing resin was sieved with JIS standard sieves (mesh sizes of 850 µm and 212 µm) to classify the resin into particle diameters of 850 µm to 212 µm.

Physical properties of the obtained comparative particulate water-absorbing resin (9) were shown in Table 1.

Example 5

A particulate water-absorbing resin (5) was obtained in the same manner as Example 1 except that the drying temperature of the hydrated polymer (hydrated gel) was changed from 180° C. to 100° C. Physical properties of the particulate water-absorbing resin (5) were shown in Table 1.

The present invention is not limited to the description above, but may be altered by a skilled person within the scope of the claims.

added). Moreover, the amount of residual monomer of each of Examples 1, 2 and 3 was smaller than that of Comparative Example 1 by 100 ppm or more. Further, other physical properties (absorption capacity, absorption capacity under load, extractable polymer (content), etc.) tend to improve in Examples 1, 2 and 3.

As compared with Comparative Example 3 using the foaming polymerization that is a conventional method, in each of Example 1 (about 15 mass % of the water-absorbing resin was added), Example 2 (about 20 mass % of the water-absorbing resin was added) and Example 3 (about 5 mass % of zeolite was added), the residual monomer was reduced by about 500 ppm, the absorption capacity under load (AAP) was improved by 2 g/g to 5 g/g, and the impact resistance of the water-absorbing resin powder was improved. Further, in the present invention, the bulk specific gravity increases 1.2 times to 1.4 times. Therefore, it is possible to reduce the cost of the transportation and warehousing significantly.

Moreover, the water-absorbing resin obtained in the above Examples and containing the fine particles or the water-absorbing resin having a specific water-absorbing performance is not easily damaged at the time of transportation and does not generate the fine powder or the dust easily. Further, it maintains high performance even in the diaper, so that it is possible to provide excellent diapers.

Since the monomer was polymerized in the form of slurry or since the initiation temperature of the polymerization was 35° C. that is low in the present Comparative Examples 5 and 6 which were in accordance with Tokukaihei 3-115313 (polymerization of slurry of sodium acrylate minute precipitate), the absorption capacity and water-absorbing rate of the water-absorbing resin obtained in each of Comparative Examples 5 and 6 were lower than those of Example 1 of the present application. Note that even if the monomer concentration is the same as the monomer concentration (56 weight % to 57 weight %) of Comparative Examples 4 and 5, the solubility of

TABLE 1

| | Absorption Capacity (g/g) | Absorption Capacity Under Load (g/g) | Absorption Rate (g/g/s) | Extractable Polymer Content (%) | Amount of Residual Monomer (ppm) | Bulk Specific Gravity (g/ml) | Falling Rate (sec) | 150 µm Pass Rate After Paint Shaker Test (%) |
|---|---|---|---|---|---|---|---|---|
| PWR (1) | 27.0 | 25.4 | 0.27 | 10.3 | 326 | 0.56 | 7.49 | 6.2 |
| PWR (2) | 32.2 | 22.2 | 0.32 | 17.0 | 389 | 0.51 | 7.66 | 7.9 |
| PWR (3) | 27.2 | 24.2 | 0.33 | 9.7 | 316 | 0.54 | 7.87 | 6.7 |
| PWR (4) | 28.6 | 25.6 | 0.26 | 8.7 | 292 | 0.56 | 7.44 | 5.6 |
| PWR (5) | 24.5 | 23.3 | 0.26 | 8.3 | 756 | 0.58 | — | 4.1 |
| CPWR (1) | 26.9 | 23.6 | 0.16 | 12.6 | 499 | 0.57 | 7.37 | 4.3 |
| CPWR (2) | 26.4 | 24.1 | 0.17 | 14.1 | 402 | 0.60 | 7.40 | 3.9 |
| CPWR (3) | 28.3 | 20.1 | 1.32 | 13.5 | 886 | 0.40 | — | 10.2 |
| CPWR (4) | 25.2 | 19.9 | 0.18 | 17.9 | 3593 | 0.60 | 7.43 | 5.8 |
| CPWR (5) | 33.7 | 13.6 | 0.14 | 23.6 | 11345 | 0.62 | — | 7.3 |
| CPWR (6) | 34.5 | 12.0 | 0.16 | 26.9 | 13976 | 0.59 | — | 9.4 |
| CPWR (7) | 27.4 | 24.9 | 0.16 | 11.2 | 466 | 0.56 | 7.50 | 6.3 |
| CPWR (8) | 28.1 | 21.9 | 0.24 | 16.0 | 732 | 0.55 | 7.44 | 8.9 |
| CPWR (9) | 45 | | 0.09 | 13.0 | | 0.83 | | |

In Table 1, "PWR" denotes "particulate water-absorbing resin", and "CPWR" denotes "comparative particulate water-absorbing resin".

(Explanation of Table)

Although the same stationary aqueous polymerization of the same polymerization temperature was carried out in Examples 1, 2 and 3 and Comparative Example 1, the absorption rate (FSR) of each of Example 1 (about 15 mass % of the water-absorbing resin was added), Example 2 (about 20 mass % of the water-absorbing resin was added) and Example 3 (about 5 mass % of zeolite was added) was about twice the absorption rate of Comparative Example 1 (the solid was not the monomer changes depending on the temperature of the solvent, and the monomer aqueous. solution may become slurry or a solution. When the temperature of the solvent is 35° C., the monomer aqueous solution becomes slurry.

Regarding an influence of the drying temperature, the water-absorbing capacity and water-absorbing rate of the water-absorbing resin obtained in Example 5 in which the drying temperature was 100° C. tend to be lower than those in Example 1 in which the drying temperature was 180° C.

Moreover, as compared with Example 1, the residual monomer tends to be increased but the impact resistance tends to be improved in Example 5.

An effect obtained by adding the water-absorbing resin (A) that is the water-insoluble solid matter could have been confirmed by comparing Example 4 with Comparative Example 7. That is, as compared with the water-absorbing resin obtained in Comparative Example 7, the water-absorbing resin obtained in Example 4 has excellent amount of residual monomer, impact resistance and absorption rate.

Further, regarding the water-absorbing resin obtained in Comparative Example 8 using 2,2'-azobis (2-amidinopropane) dihydrochloride as the initiator, the absorption rate was improved, but the impact resistance was deteriorated.

[Industrial Applicability]

According to the method for manufacturing the water-absorbing resin of the present invention, as compared with conventional manufacturing methods, it is possible to manufacture the water-absorbing resin such that (i) the productivity is not spoiled, (ii) the cost is advantageous, (iii) the deterioration of the physical properties due to the generation of powder is small, and (iv) the absorption rate is improved dramatically. Moreover, the foaming polymerization is not necessary, the manufacturing process can be simplified, and the cost can be reduced.

Moreover, the water-absorbing resin obtained by the manufacturing method of the present invention and containing the fine particles. or the water-absorbing resin having a specific water-absorbing performance is not easily damaged at the time of transportation and does not generate the fine power or the dust easily. Further, it maintains high performance even in the diaper, so that it is possible to provide excellent diapers.

In the present invention, by supplying a specific amount of the water-absorbing resin, it is possible to improve the absorption rate, reduce the residual monomer, carry out the particle size control, improve the absorption capacity under load, control the bulk specific gravity, improve the impact resistance, etc., although it has conventionally been difficult to realize these improvements in general.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A water-absorbing resin particle comprising:
    repeating units of acrylic acid (salt) of 70 mole % to 99.999 mole %;
    a crosslinking agent of 0.001 mole % to 5 mole %; and
    water-insoluble particles
        selected from the group consisting of bentonite, zeolite, silicon oxide, aluminum oxide, activated carbon and a crosslinked polycation compound;
    wherein the water-absorbing resin particle satisfies (1) to (7) below,
        (1) an absorption capacity (CRC) being 20 g/g to 40 g/g,
        (2) an absorption capacity under load (AAP) being 20 g/g to 40 g/g,
        (3) an absorption rate (FSR) being 0.30 g/g/sec to 0.80 g/g/sec,
        (4) a bulk specific gravity (JIS K 3362) being 0.50 g/ml to 0.80 g/ml,
        (5) a residual monomer being 0 ppm to 400 ppm,
        (6) particles (JIS Z8801-1) of 850 μm to 150 μm being 95 weight % to 100 weight %, and
        (7) a liquid permeability efficiency under load (PPUP) being from 90% to 100%.

2. The water-absorbing resin particle as set forth in claim 1, obtained by polymerizing an aqueous solution of the acrylic acid (salt) monomer and the cross-linking agent, and
    containing therein 0.1 weight % to 50 weight % of the water-insoluble particles on the basis of a weight of the acrylic acid (salt) monomer at the time of the polymerization.

3. The water-absorbing resin particle as set forth in claim 1, obtained by polymerizing an aqueous solution of the acrylic acid (salt) monomer and the cross-linking agent, and
    containing therein 1 weight % to 50 weight % of the water-insoluble particles on the basis of a weight of the acrylic acid (salt) monomer at the time of the polymerization.

4. The water-absorbing resin particle as set forth in claim 1, wherein the crosslinked polycation compound is selected from the group consisting of polyethylenimine, polyvinylamine and polyallylamine.

5. A method for manufacturing a water-absorbing resin of claim 1, comprising the steps of: carrying out stationary polymerization of an aqueous solution containing 70 mole % to 99.999 mole % of acrylic acid (salt) and 0.001 mole % to 5 mole % of a crosslinking agent in the presence of water-insoluble particles selected from the group consisting of bentonite, zeolite, silicon oxide, aluminum oxide, activated carbon and a crosslinked polycation compound;
    adjusting an initiation temperature of the polymerization to 40° C. or more or adjusting a maximum temperature of the polymerization to 100° C. or more,
    wherein the water-absorbing resin obtained satisfies (1) to (7) below,
        (1) an absorption capacity (CRC) being 20 g/g to 40 g/g,
        (2) an absorption capacity under load (AAP) being 20 g/g to 40 g/g,
        (3) an absorption rate (FSR) being 0.30 g/g/sec to 0.80 g/g/sec,
        (4) a bulk specific gravity (JIS K 3362) being 0.50 g/ml to 0.80 g/ml,
        (5) a residual monomer being 0 ppm to 400 ppm,
        (6) particles (JIS Z8801-1) of 850 μm to 150 μm being 95 weight % to 100 weight %, and
        (7) a liquid permeability efficiency under load (PPUP) being from 90% to 100%.

6. The method as set forth in claim 5, wherein the stationary polymerization is carried out using a continuous belt apparatus.

7. The method as set forth in claim 5, wherein a content of the water insoluble particles is 0.1 weight % to 50 weight % with respect to the acrylic acid (salt) monomer, and 90 weight % or more of the water insoluble particles have passed through a 5 mm standard sieve.

8. The method as set forth in claim 5, wherein a polymerization time is 10 minutes or less.

9. The method as set forth in claim 5, wherein a concentration of the aqueous solution of the monomer is in a range from 40 weight % to 90 weight %.

* * * * *